US012469997B2

(12) United States Patent
Komoto et al.

(10) Patent No.: US 12,469,997 B2
(45) **Date of Patent: *Nov. 11, 2025**

(54) CONNECTOR AND CONNECTING METHOD

(71) Applicant: Japan Aviation Electronics Industry, Limited, Tokyo (JP)

(72) Inventors: Tetsuya Komoto, Tokyo (JP); Akira Kimura, Tokyo (JP); Keisuke Nakamura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,226

(22) Filed: Jun. 12, 2024

(65) Prior Publication Data

US 2024/0332839 A1 Oct. 3, 2024

Related U.S. Application Data

(62) Division of application No. 17/677,398, filed on Feb. 22, 2022, now Pat. No. 12,300,919.

(30) Foreign Application Priority Data

Mar. 19, 2021 (JP) ................................ 2021-045912

(51) Int. Cl.
*H01R 12/65* (2011.01)
*H01R 12/71* (2011.01)
(Continued)

(52) U.S. Cl.
CPC ........... *H01R 12/716* (2013.01); *H01R 12/65* (2013.01); *H01R 13/4223* (2013.01); *H01R 13/502* (2013.01); *H01R 13/629* (2013.01)

(58) Field of Classification Search
None
See application file for complete search history.

(56) References Cited

U.S. PATENT DOCUMENTS 1,530,011 A * 3/1925 Pacent .................. H01R 24/58 439/655
3,384,865 A * 5/1968 Bosworth ............. H01R 12/55 439/174
(Continued)

FOREIGN PATENT DOCUMENTS

CN 108011212 A 5/2018
EP 3609026 A1 2/2020
(Continued)

*Primary Examiner* — Felix O Figueroa
(74) *Attorney, Agent, or Firm* — MUNCY, GEISSLER, OLDS & LOWE, P.C.

(57) ABSTRACT

A connector includes a contact retained in a housing selectively in one of a first posture and a second posture inverted 180 degrees around a fitting direction, the contact including a contact portion to be contacted with a contact of a counter connector and a connection portion to be connected to a flexible conductor of a connection object, between a case where the contact is retained in the housing in the first posture and a case where the contact is retained in the housing in the second posture, the contact portion is situated at a same position with respect to the housing and the connection portion is situated at a different position with respect to the housing, the contact being retained in the housing in, of the first posture and the second posture, a posture corresponding to an orientation of a flexible conductor exposed surface of the connection object.

2 Claims, 28 Drawing Sheets

(51) Int. Cl.

| | |
|---|---|
| ***H01R 13/422*** | (2006.01) |
| ***H01R 13/502*** | (2006.01) |
| ***H01R 13/629*** | (2006.01) |

(56) References Cited

U.S. PATENT DOCUMENTS

| | | | | |
|---|---|---|---|---|
| 3,766,513 | A * | 10/1973 | Carre | H01R 13/428 439/747 |
| 4,458,970 | A * | 7/1984 | Fourreau | H01R 13/02 439/891 |
| 5,507,651 | A * | 4/1996 | Tanaka | H01R 12/716 439/632 |
| 5,634,819 | A * | 6/1997 | Pan | H01R 12/721 439/947 |
| 10,498,097 | B2 * | 12/2019 | Komoto | H01R 13/2442 |
| 10,617,155 | B2 * | 4/2020 | Komoto | H01R 13/73 |
| 10,868,380 | B1 * | 12/2020 | Komoto | H01R 12/771 |
| 10,886,650 | B1 * | 1/2021 | Komoto | H01R 12/592 |
| 11,211,726 | B2 * | 12/2021 | Komoto | H01R 12/778 |
| 12,300,919 | B2 * | 5/2025 | Komoto et al. | |
| 2019/0148901 | A1 | 5/2019 | Komoto | |
| 2021/0075146 | A1 | 3/2021 | Matsuo et al. | |

FOREIGN PATENT DOCUMENTS

| | | |
|---|---|---|
| JP | 2019087515 A | 6/2019 |
| JP | 2021044104 A | 3/2021 |

* cited by examiner

CONNECTOR AND CONNECTING METHOD

CROSS REFERENCE TO RELATED APPLICATIONS

This application is a Divisional of co-pending application Ser. No. 17/677,398, filed on Feb. 22, 2022, for which priority is claimed under 35 U.S.C. § 120; and this application claims priority of Application No. JP 2021-045912 filed in Japan on Mar. 19, 2021 under 35 U.S.C. § 119, the entire contents of all of which are hereby incorporated by reference.

BACKGROUND OF THE INVENTION

The present invention relates to a connector and a connecting method, particularly to a connector attached to a connection object having a flexible conductor exposed on one surface of the connection object, as well as a connecting method.

As a connector attached to a connection object having a flexible conductor, for instance, JP 2019-87515 A discloses a connector 1 shown in FIG. 54. The connector 1 has the structure in which a connection object 4 is sandwiched and held between a first insulating member 2 of flat plate shape and a second insulating member 3 of frame shape having an opening 3A in its center.

In the first insulating member 2, there are formed convex portions 2A projecting in the opening 3A of the second insulating member 3 and projections 2B projecting toward the second insulating member 3 at positions closer to the lateral edge portions of the first insulating member 2 than the convex portions 2A are. Contacts 5 are retained by the first insulating member 2 to be exposed on surfaces of the convex portions 2A and the projections 2B. Projection accommodating portions 3B of recess shape for accommodating the projections 2B of the first insulating member 2 are formed at the surface of the second insulating member 3 that faces the first insulating member 2.

The connection object 4 has flexible conductors 6 exposed on the bottom surface of the connection object 4, i.e., the surface facing the first insulating member 2. When the first insulating member 2 and the second insulating member 3 are pushed to approach each other in the state where the connection object 4 is disposed between the first and second insulating members 2 and 3, as shown in FIG. 55, the connection object 4 is inserted into the projection accommodating portion 3B of the second insulating member 3 by the projection 2B of the first insulating member 2. Consequently, the connection object 4 is sandwiched between the inner surface of the projection accommodating portion 3B and a part of the contact 5 disposed on the surface of the projection 2B of the first insulating member 2, so that the contact 5 is electrically connected to the flexible conductor 6 exposed on the bottom surface of the connection object 4.

Meanwhile, another part of the contact 5 that is situated on the surface of the convex portion 2A of the first insulating member 2 makes contact with and is electrically connected to the corresponding contact of a counter connector when a part of the counter connector is inserted into the opening 3A of the second insulating member 3 and the counter connector is fitted to the connector 1.

Thus, the use of the connector 1 of JP 2019-87515 A makes it possible to electrically connect the contact 5 to the flexible conductor 6 exposed on the bottom surface of the connection object 4.

However, since the bottom surface of the connection object 4 makes contact with the contact 5 in the projection accommodating portion 3B of the second insulating member 3, in the case where the flexible conductor 6 is exposed not on the bottom surface but only on the top surface of the connection object 4, the contact 5 cannot be electrically connected to the flexible conductor 6.

SUMMARY OF THE INVENTION

The present invention has been made to solve the foregoing problem and aims at providing a connector that enables to make an electrical connection of a contact to a flexible conductor of a connection object regardless of whether the flexible conductor is exposed on the top surface or the bottom surface of the connection object.

The present invention also aims at providing a connecting method for electrically connecting a contact to a flexible conductor of a connection object by use of the connector as above.

A connector according to the present invention is one that is attached to a connection object having a flexible conductor exposed on one surface of the connection object and that is to be fitted with a counter connector in a fitting direction, the connector comprising:

a housing attached to the connection object; and at least one contact made of a conductive material and retained in the housing selectively in one of a first posture and a second posture that are postures inverted 180 degrees from each other around the fitting direction, wherein the housing includes a first insulator and a second insulator that are assembled to each other in a predetermined assembling direction while sandwiching the connection object therebetween, the at least one contact includes a contact portion to be contacted with a contact of the counter connector and a connection portion to be connected to the flexible conductor of the connection object, the contact portion projecting from the first insulator in the fitting direction, between a case where the at least one contact is retained in the housing in the first posture and a case where the at least one contact is retained in the housing in the second posture, the contact portion is situated at a same position with respect to the housing and the connection portion is situated at a different position with respect to the housing, and the at least one contact is retained in the housing in, of the first posture and the second posture, a posture corresponding to an orientation of a surface of the connection object on which surface the flexible conductor is exposed.

A connecting method according to the present invention is one for connecting the at least one contact of the connector according to claim 1 to a flexible conductor exposed on one surface of a connection object, the method comprising:

putting the at least one contact such that the at least one contact is temporarily retained in the first insulator or the second insulator of the housing in, of the first posture and the second posture, a posture corresponding to an orientation of a surface of the connection object on which surface the flexible conductor is exposed, disposing the connection object between the first insulator and the second insulator, and assembling the first insulator and the second insulator to each other in the predetermined assembling direction, whereby the connection portion of the at least one contact is connected to the flexible conductor of the connection object.

Figure 1:
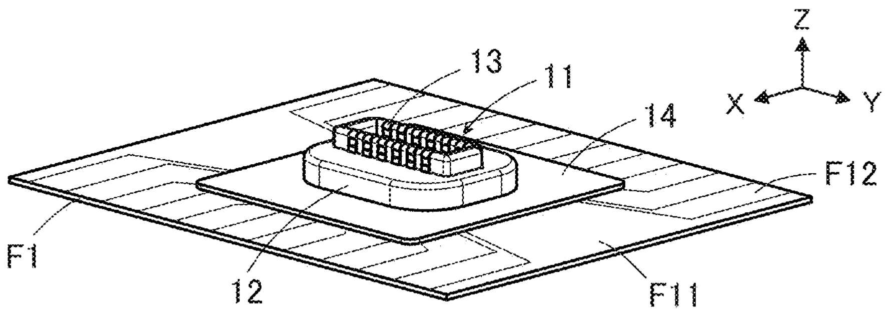
FIG. 1 is a perspective view of a connector according to Embodiment 1 attached to a connection object on the top surface of which flexible conductors are exposed, as viewed from an obliquely upper position.

The crosshatching shown in the drawings is provided for illustrative purposes only and is not intended to indicate any particular material. The crosshatching shown in the drawings is purely illustrative and does not limit the invention to specific materials.

DETAILED DESCRIPTION OF THE INVENTION

Embodiments of the present invention are described below with reference to the accompanying drawings.

Embodiment 1

Figure 2:
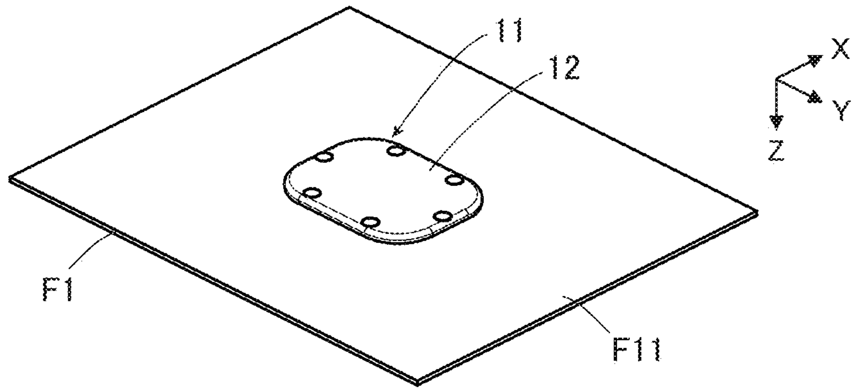
FIG. 2 is a perspective view of the connector according to Embodiment 1 attached to the connection object on the top surface of which the flexible conductors are exposed, as viewed from an obliquely lower position.

FIGS. 1 and 2 show a connector 11 according to Embodiment 1. The connector 11 is attached to a connection object F1 such as a garment for example and used as a connector for fitting a wearable device. The connector 11 includes a housing 12 made of an insulating material. In the housing 12, a plurality of contacts 13 are aligned in two rows parallel to each other and retained to project perpendicularly to the connection object F1.

The connector 11 is attached to the connection object F1 along with a reinforcing sheet 14 for reinforcing the connection object F1.

For the connection object F1, use may be made of, for instance, a garment having a so-called smart textile that is provided, on at least one surface thereof, with wiring formed by weaving conductive fibers into the textile, printing with conductive ink, or another method. As shown in FIG. 1, in the connection object F1, wiring constituted of a plurality of flexible conductors F12 is exposed on the top surface, which faces in the +Z direction, of a textile F11 made of an insulating material. As shown in FIG. 2, the flexible conductors F12 are not exposed on the bottom surface, which faces in the −Z direction, of the textile F11.

For convenience, the connection object F1 is defined as extending in an XY plane, the direction in which the contacts 13 are aligned is referred to as "Y direction," and the direction in which the contacts 13 project is referred to as "+Z direction." The Z direction is a fitting direction in which the connector 11 is fitted to a counter connector.

Figure 3:
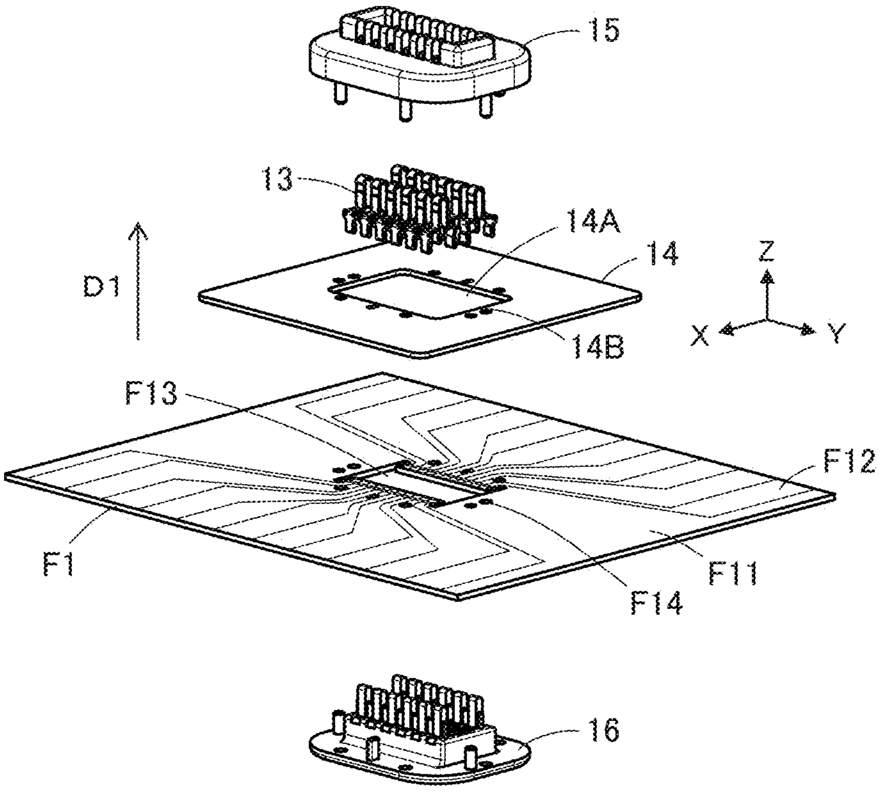
FIG. 3 is an exploded perspective view of the connector according to Embodiment 1.

FIG. 3 is an exploded perspective view of the connector 11. The connector 11 includes a first insulator 15 and a second insulator 16, and these first and second insulators 15 and 16 constitute the housing 12.

The contacts 13 are separately and temporarily retained in the first insulator 15, and the second insulator 16 is assembled to the first insulator 15 in the +Z direction which is a predetermined assembling direction D1, with the second insulator 16 and the first insulator 15 sandwiching the connection object F1 and the reinforcing sheet 14 therebetween.

A rectangular opening F13 is formed in the textile F11 of the connection object F1, and one ends of the flexible conductors F12 are situated at the +X direction-side edge and the −X direction-side edge of the opening F13. Further, a plurality of through-holes F14 are formed around the opening F13 of the textile F11.

The reinforcing sheet 14 is also provided with an opening 14A and a plurality of through-holes 14B similarly to the opening F13 and the through-holes F14 of the connection object F1.

Figure 4:
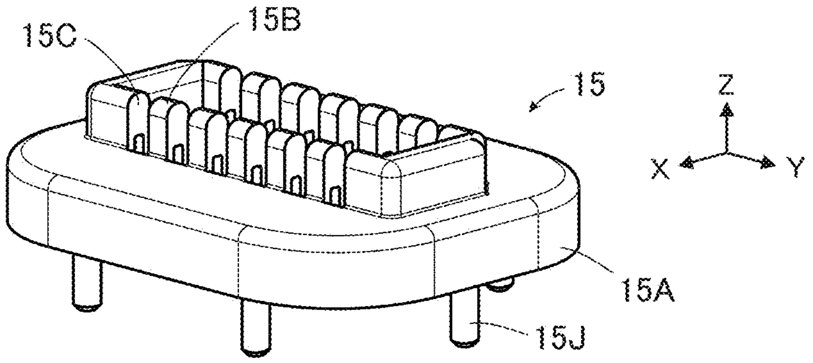
FIG. 4 is a perspective view of a first insulator used in the connector according to Embodiment 1, as viewed from an obliquely upper position.
Figure 5:
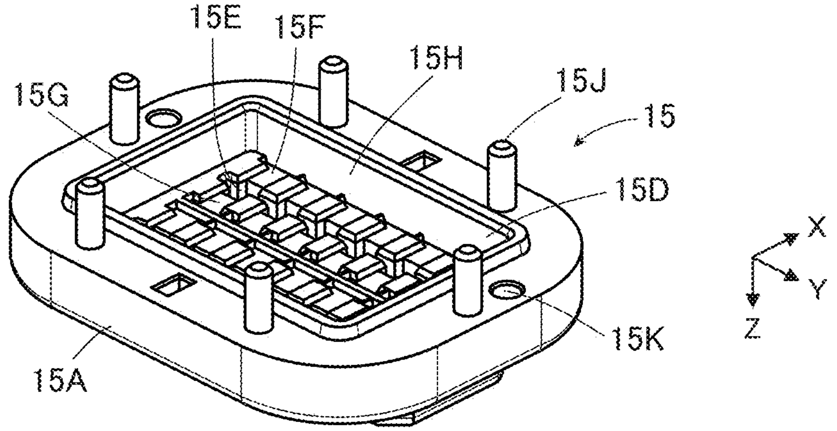
FIG. 5 is a perspective view of the first insulator used in the connector according to Embodiment 1, as viewed from an obliquely lower position.

As shown in FIGS. 4 and 5, the first insulator 15 includes a base portion 15A of flat plate shape extending in an XY plane and a plurality of projection portions 15B projecting in the +Z direction from the base portion 15A and arranged in a frame shape. A gap 15C is formed between each adjacent pair of projection portions 15B.

A recess portion 15D of rectangular shape that opens in the −Z direction is formed at the −Z direction-side surface of the base portion 15A, and the bottom of the recess portion 15D is provided with a plurality of through-holes 15E penetrating from the corresponding gaps 15C on the +Z direction side of the base portion 15A to the recess portion 15D. The through-holes 15E correspond to the contacts 13 and form a first row in which some through-holes 15E are aligned in the Y direction along the +X direction-side edge of the recess portion 15D and a second row in which the other through-holes 15E are aligned in the Y direction along the −X direction-side edge of the recess portion 15D.

The bottom of the recess portion 15D is provided with retaining surfaces 15F and 15G of flat shape that extend in an XY plane on the opposite sides, in the X direction, of the respective through-holes 15E. For each of the through-holes 15E aligned in the Y direction along the +X direction-side edge of the recess portion 15D in the first row, the retaining surface 15F is situated on the +X direction side of the through-hole 15E, while the retaining surface 15G is situated on the −X direction side thereof. For each of the through-holes 15E aligned in the Y direction along the −X direction-side edge of the recess portion 15D in the second row, the retaining surface 15F is situated on the −X direction side of the through-hole 15E, while the retaining surface 15G is situated on the +X direction side thereof.

In other words, of the retaining surfaces 15F and 15G formed on the opposite sides, in the X direction, of each through-hole 15E, the retaining surface 15F is situated in the vicinity of an inner wall surface 15H of the recess portion 15D and reaches the inner wall surface 15H. The inner wall surface 15H of the recess portion 15D constitutes a first opposed surface extending in the Z direction that is the fitting direction.

The recess portion 15D is formed to have a width in the X direction larger than that of the opening F13 of the connection object F1.

Further, the −Z direction-side surface of the base portion 15A is provided with a plurality of fixing posts 15J projecting in the −Z direction and a plurality of fixing holes 15K extending in the +Z direction.

Figure 6:
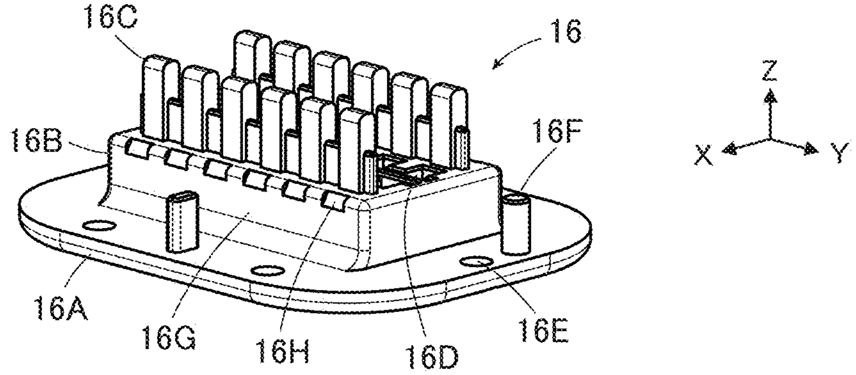
FIG. 6 is a perspective view of a second insulator used in the connector according to Embodiment 1, as viewed from an obliquely upper position.
Figure 7:
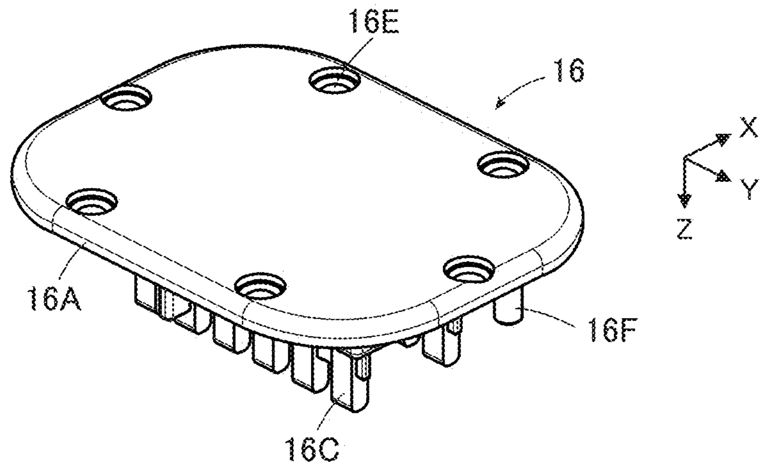
FIG. 7 is a perspective view of the second insulator used in the connector according to Embodiment 1, as viewed from an obliquely lower position.

As shown in FIGS. 6 and 7, the second insulator 16 includes a base portion 16A of flat plate shape extending in an XY plane, a protrusion portion 16B of rectangular cuboid shape situated in the center of the base portion 16A and protruding in the +Z direction from the base portion 16A, and a plurality of columnar members 16C projecting in the +Z direction from the protrusion portion 16B.

The protrusion portion 16B is to be inserted into the recess portion 15D of the first insulator 15 in the process of attaching the connector 11 to the connection object F1, and has a size slightly smaller than that of the recess portion 15D. The protrusion portion 16B is formed to have a width in the X direction larger than that of the opening F13 of the connection object F1.

The columnar members 16C correspond to the contacts 13 and form a first row in which some columnar members 16C are aligned in the Y direction along the +X direction-side edge of the protrusion portion 16B and a second row in which the other columnar members 16C are aligned in the Y direction along the −X direction-side edge of the protrusion portion 16B.

The protrusion portion 16B is provided with a plurality of part-of-contact accommodating portions 16D of recess shape extending in the −Z direction separately on the −X direction side of the columnar members 16C forming the first row and on the +X direction side of the columnar members 16C forming the second row.

The base portion 16A is provided with a plurality of through-holes 16E situated around the protrusion portion 16B and penetrating through the base portion 16A in the Z direction and a plurality of fixing posts 16F projecting in the +Z direction.

An outer surface 16G of the protrusion portion 16B constitutes a second opposed surface extending in the Z direction that is the fitting direction.

Figure 8:
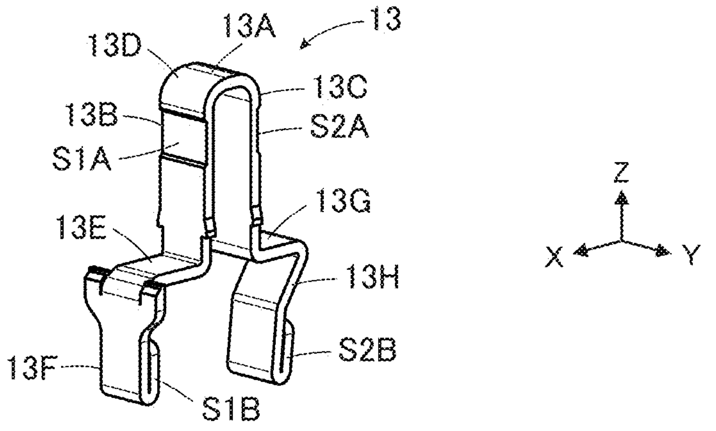
FIG. 8 is a perspective view of a contact used in the connector according to Embodiment 1, as viewed from an obliquely upper position.
Figure 9:
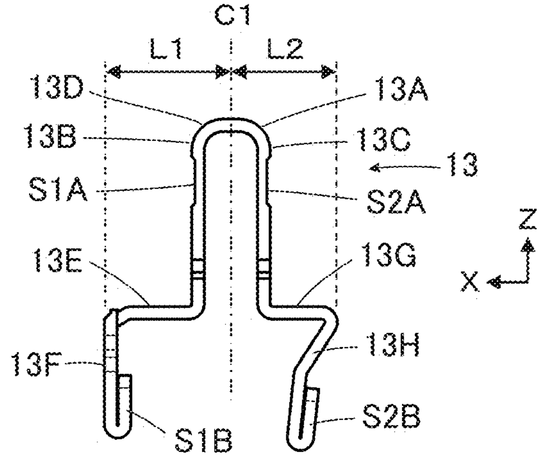
FIG. 9 is a side view showing the contact used in the connector according to Embodiment 1.

FIGS. 8 and 9 show the structure of each of the contacts 13 aligned on the +X direction side, of the plurality of contacts 13 shown in FIG. 3.

The contact 13 is constituted of a band-like member made of a conductive material such as metal and includes a U-shaped portion 13A extending in the Z direction and bent in a U shape. The U-shaped portion 13A is composed of a pair of extension portions 13B and 13C extending along a YZ plane and facing each other in the X direction and a top portion 13D connecting the +Z directional ends of the extension portions 13B and 13C to each other. The −Z directional end of the extension portion 13B is connected to a flat plate portion 13F extending along a YZ plane via a first joint portion 13E extending along an XY plane. The −Z directional end of the extension portion 13C is connected, via a second joint portion 13G extending along an XY plane, to a flat plate portion 13H extending while being inclined toward the +X direction side with respect to a YZ plane.

The outer surface of the extension portion 13B on the +X direction side and the outer surface of the extension portion 13C on the −X direction side respectively form a first contact surface S1A and a second contact surface S2A for making contact with a contact of a counter connector.

The −Z directional end of the flat plate portion 13F is folded back from the +X direction toward the +Z direction, and the −X direction-side surface of the folded portion forms a first connection surface S1B that is to make contact with the flexible conductor F12 of the connection object F1. Similarly, the −Z directional end of the flat plate portion 13H is folded back from the +X direction toward the +Z direction, and the −X direction-side surface of the folded portion forms a second connection surface S2B that is to make contact with a flexible conductor F22 of a connection object F2, which will be described later. Thus, the first connection surface S1B and the second connection surface S2B do not face the opposite directions but face the substantially the same direction.

As shown in FIG. 9, when viewed from the Y direction, the U-shaped portion 13A has a center line C1 extending in the Z direction, and the first and second contact surfaces S1A and S2A are situated symmetrically with respect to the centerline C1.

In contrast, the first and second connection surfaces S1B and S2B are situated asymmetrically with respect to the centerline C1. In other words, the X directional length of the second joint portion 13G is set smaller than that of the first joint portion 13E, and an X directional distance L2 from the centerline C1 to the +Z directional end of the flat plate portion 13H provided with the second connection surface S2B is shorter than an X directional distance L1 from the centerline C1 to the flat plate portion 13F. The X directional length of the first joint portion 13E is set to be substantially the same as that of the retaining surface 15F in the recess portion 15D of the first insulator 15 shown in FIG. 5.

Note that, of the plurality of contacts 13 shown in FIG. 3, the contacts 13 aligned on the −X direction side have the same structure as that of the contact 13 shown in FIGS. 8 and 9 but are disposed in the opposite orientation therefrom in the X direction.

Figure 10:
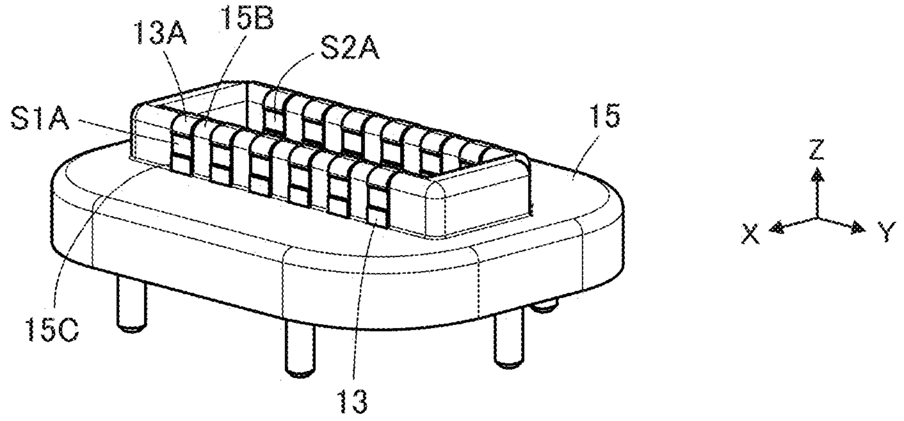
FIG. 10 is a perspective view of the first insulator of Embodiment 1 in which the contacts are temporarily retained, as viewed from an obliquely upper position.
Figure 11:
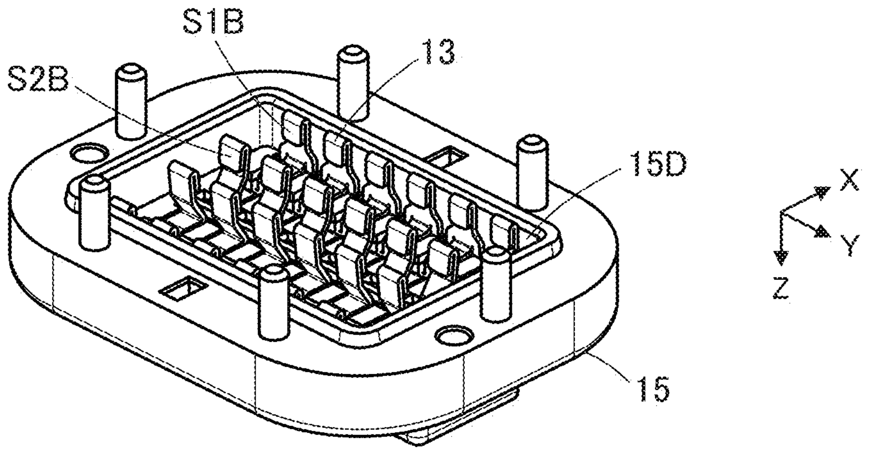
FIG. 11 is a perspective view of the first insulator of Embodiment 1 in which the contacts are temporarily retained, as viewed from an obliquely lower position.

In the process of attaching the connector 11 to the connection object F1, first, the respective contacts 13 are pushed into the first insulator 15 from the −Z direction toward the +Z direction, whereby the contacts 13 are temporarily retained in the first insulator 15 as shown in FIGS. 10 and 11. In this process, the U-shaped portion 13A of each contact 13 is passed through the corresponding through-hole 15E from the recess portion 15D on the −Z direction side of the first insulator 15 and inserted into the corresponding gap 15C formed between adjacent projection portions 15B, so that the first and second contact surfaces S1A and S2A are exposed on the +Z direction side of the first insulator 15.

Figure 12:
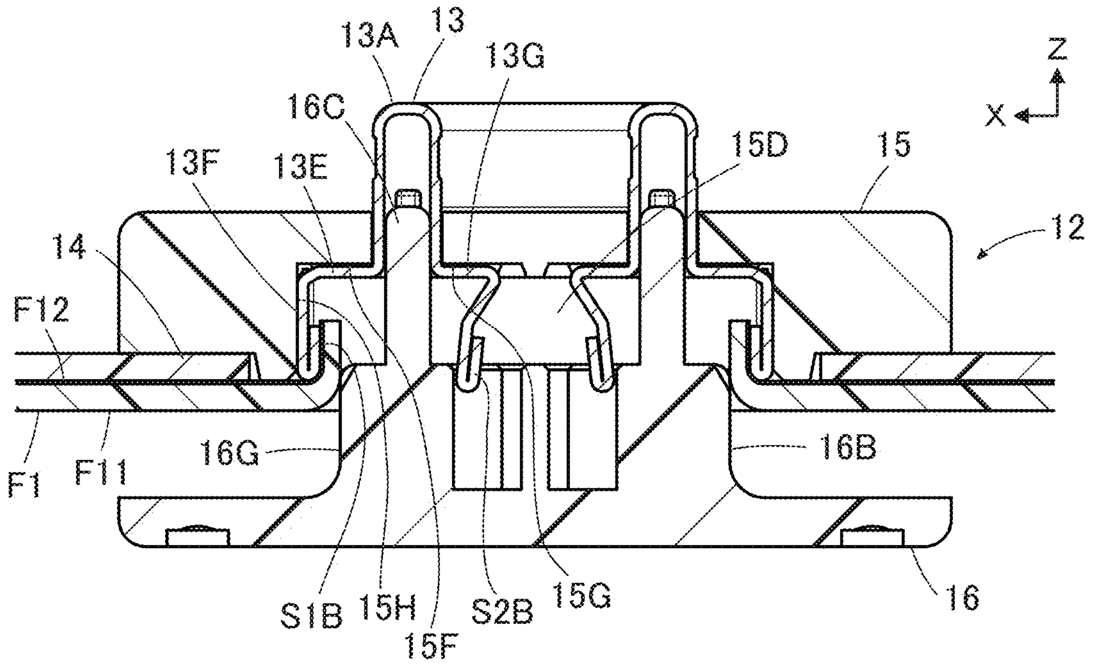
FIG. 12 is a cross-sectional view showing the connector according to Embodiment 1 in the process of attaching the connector to the connection object on the top surface of which the flexible conductors are exposed.

As shown in FIG. 12, of each contact 13, the first and second joint portions 13E and 13G, the first connection surface S1B connected to the first joint portion 13E, and the second connection surface S2B connected to the second joint portion 13G are situated within the recess portion 15D.

While the contacts 13 are aligned in two rows, i.e., the row on the +X direction side and the row on the −X direction side, the contacts 13 constituting the respective rows may be produced to be joined to one carrier (not shown) so that all of the contacts 13 can be moved and temporarily retained in the first insulator 15 at a time by use of the carrier. The carrier is cut and removed from the contacts 13 after all of the contacts 13 constituting the respective rows are moved and temporarily retained.

The first and second joint portions 13E and 13G of the contact 13 make contact with the retaining surfaces 15F and 15G in the recess portion 15D of the first insulator 15, respectively. The posture of the contact 13 thus retained in the housing 12 constituted of the first and second insulators 15 and 16 such that the first and second joint portions 13E and 13G make contact with the retaining surfaces 15F and 15G in the recess portion 15D of the first insulator 15, respectively, is called "first posture."

As described above, the X directional length of the first joint portion 13E of the contact 13 is substantially the same as that of the retaining surface 15F of the first insulator 15. Accordingly, when the contact 13 is retained in the housing 12 in the first posture, the flat plate portion 13F connected to the first joint portion 13E of the contact 13 contacts or faces the inner wall surface 15H of the recess portion 15D of the first insulator 15, and the first connection surface S1B faces the opposite side from the inner wall surface 15H.

Now, the fixing posts 15J of the first insulator 15 are sequentially passed through the through-holes 14B of the reinforcing sheet 14 and the through-holes F14 of the connection object F1 such that the reinforcing sheet 14 and the connection object F1 lie on the −Z direction side of the first insulator 15, whereafter the second insulator 16 is moved in the +Z direction to start the assembly thereof into the first insulator 15 as shown in FIG. 12.

In this process, the columnar members 16C of the second insulator 16 are each inserted into the inside of the U-shaped portion 13A of the corresponding contact 13 from the −Z direction.

Further, the protrusion portion 16B of the second insulator 16 is sequentially passed through the opening F13 of the connection object F1 and the opening 14A of the reinforcing sheet 14 from the −Z direction and then inserted into the recess portion 15D of the first insulator 15. In this process, the +X direction-side edge and the −X direction-side edge of the opening F13 of the connection object F1 are pushed while being bent toward the +Z direction by the protrusion portion 16B of the second insulator 16 and thereby enter between the outer surface 16G of the protrusion portion 16B of the second insulator 16 and the inner wall surface 15H of the recess portion 15D of the first insulator 15.

Figure 13:
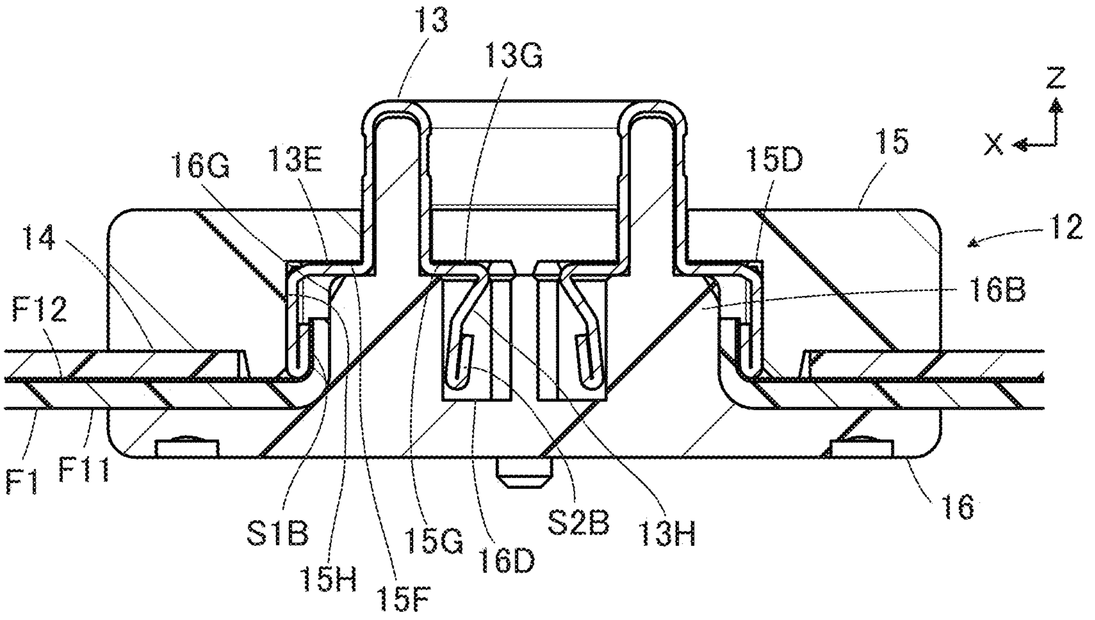
FIG. 13 is a cross-sectional view showing the connector according to Embodiment 1 attached to the connection object on the top surface of which the flexible conductors are exposed.

In this state, when the second insulator 16 is moved toward the first insulator 15 in the +Z direction, as shown in FIG. 13, the first and second joint portions 13E and 13G of each contact 13 are separately sandwiched between the +Z direction-side surface of the protrusion portion 16B of the second insulator 16 and the corresponding retaining surfaces 15F and 15G in the recess portion 15D of the first insulator 15. Thus, the contacts 13 are retained by the first insulator 15 and the second insulator 16.

Further, the flexible conductor F12 exposed on the top surface of the textile F11 of the connection object F1 is pushed and bent toward the +Z direction by the protrusion portion 16B of the second insulator 16, and in this state, the flexible conductor F12 is sandwiched between the inner wall surface 15H, which constitutes the first opposed surface, of the recess portion 15D of the first insulator 15 and the outer surface 16G, which constitutes the second opposed surface, of the protrusion portion 16B of the second insulator 16 and makes contact at a predetermined contact pressure with the first connection surface S1B of the contact 13 which faces the opposite side from the inner wall surface 15H of the recess portion 15D of the first insulator 15. Thus, the contacts 13 are electrically connected to the flexible conductors F12 of the connection object F1.

The flat plate portion 13H and the second connection surface S2B connected to the second joint portion 13G of each contact 13 are accommodated in the corresponding part-of-contact accommodating portion 16D of the second insulator 16.

The fixing posts 15J of the first insulator 15 are passed through the corresponding through-holes 16E of the second insulator 16 and project on the −Z direction side of the second insulator 16, while the fixing posts 16F of the second insulator 16 are inserted into the corresponding fixing holes 15K of the first insulator 15.

The −Z directional ends of the fixing posts 15J of the first insulator 15 that project on the −Z direction side of the second insulator 16 are heated and deformed whereby the second insulator 16 is fixed with respect to the first insulator 15.

Thus, attachment of the connector 11 to the connection object F1 is completed as shown in FIG. 1.

While the connection object F1 to which the connector 11 is attached has wiring constituted of the flexible conductors F12 being exposed on the top surface, which faces in the +Z direction, of the textile F11, the connector 11 according to Embodiment 1 is not limited to this configuration.

Figure 14:
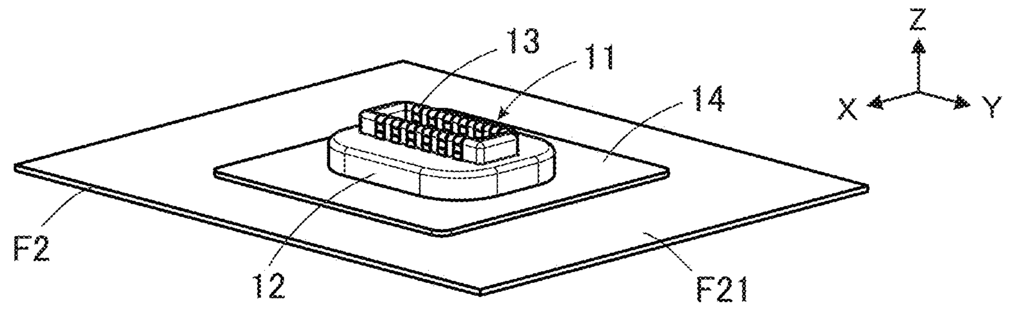
FIG. 14 is a perspective view of the connector according to Embodiment 1 attached to a connection object on the bottom surface of which flexible conductors are exposed, as viewed from an obliquely upper position.
Figure 15:
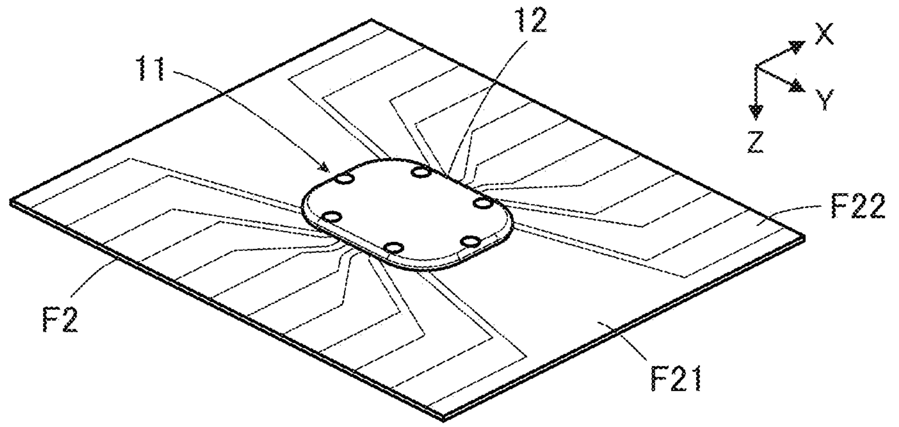
FIG. 15 is a perspective view of the connector according to Embodiment 1 attached to the connection object on the bottom surface of which the flexible conductors are exposed, as viewed from an obliquely lower position.

The connector 11 can also be attached to the connection object F2 having wiring constituted of the flexible conductors F22 being exposed on the bottom surface, which faces in the −Z direction, of a textile F21 as shown in FIGS. 14 and 15 only by changing the posture of the contacts 13 retained by the housing 12.

Figure 16:
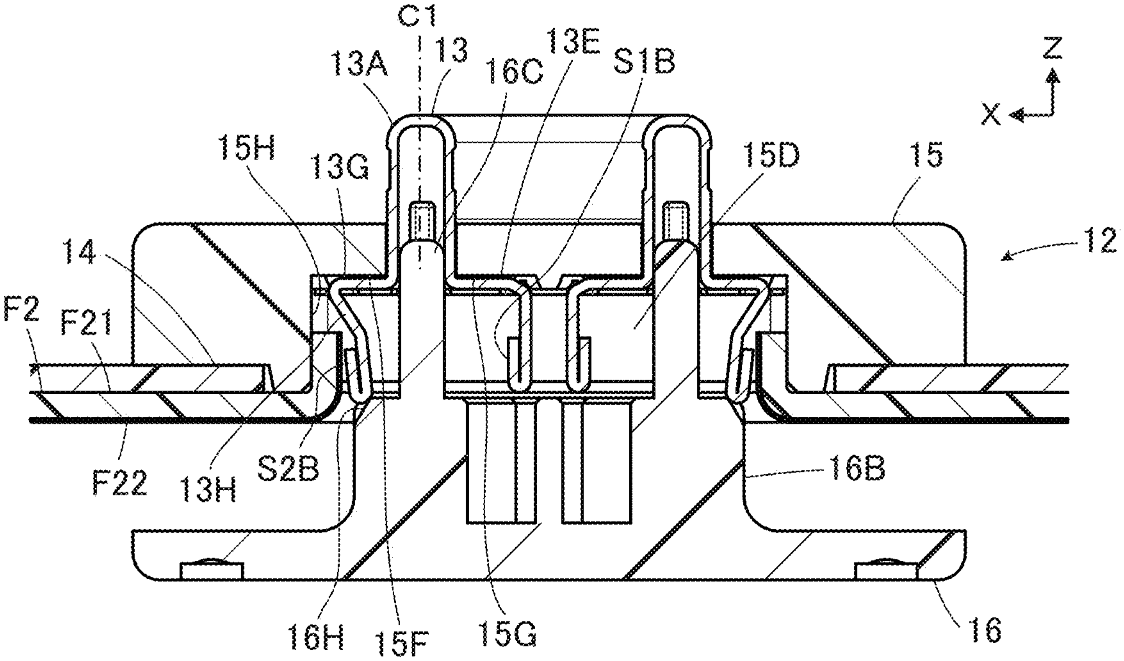
FIG. 16 is a cross-sectional view showing the connector according to Embodiment 1 in the process of attaching the connector to the connection object on the bottom surface of which the flexible conductors are exposed.

The connector 11 in the process of attachment to the connection object F2 is shown in FIG. 16. Each contact 13 is temporarily retained in the first insulator 15 in the posture where the first and second joint portions 13E and 13G make contact with the retaining surfaces 15G and 15F in the recess portion 15D of the first insulator 15, respectively. Compared to the first posture shown in FIGS. 12 and 13, the above posture of the contact 13 is inverted 180 degrees therefrom around the centerline C1 of the U-shaped portion 13A extending in the Z direction, and this posture is called "second posture."

In the second posture, the second connection surface S2B of the contact 13 is situated closer to the inner wall surface 15H of the recess portion 15D of the first insulator 15 than the first connection surface S1B is, and faces the inner wall surface 15H.

As described above, the X directional length of the retaining surface 15F of the first insulator 15 is substantially the same as that of the first joint portion 13E of the contact 13, and the X directional length of the second joint portion 13G is smaller than that of the first joint portion 13E. Accordingly, when the contact 13 is temporarily retained in the first insulator 15 in the second posture, the second connection surface S2B formed in the flat plate portion 13H connected to the second joint portion 13G makes no contact with the inner wall surface 15H of the recess portion 15D of the first insulator 15, and a predetermined gap is formed between the second connection surface S2B and the inner wall surface 15H.

The edge of the connection object F2 is bent toward the +Z direction and inserted between the inner wall surface 15H of the recess portion 15D of the first insulator 15 and the second contact surface S2B of the contact 13.

In this state, when the second insulator 16 is moved toward the first insulator 15 in the +Z direction, the columnar members 16C of the second insulator 16 are each inserted into the inside of the U-shaped portion 13A of the corresponding contact 13 from the −Z direction.

Further, the protrusion portion 16B of the second insulator 16 is inserted into the recess portion 15D of the first insulator 15 and pushes the flat plate portion 13H of the contact 13 toward the inner wall surface 15H of the recess portion 15D of the first insulator 15.

The protrusion portion 16B of the second insulator 16 is provided with taper shape portions 16H at the edge, and the flat plate portions 13H of the contacts 13 are guided by the taper shape portions 16H so that the flat plate portions 13H are smoothly pushed to move toward the inner wall surface 15H of the recess portion 15D of the first insulator 15.

Figure 17:
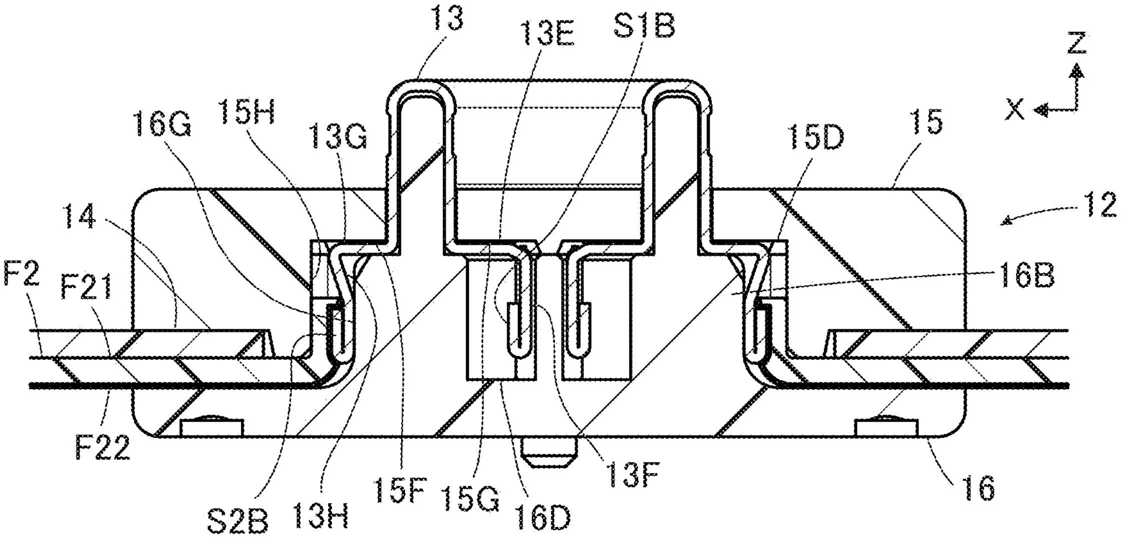
FIG. 17 is a cross-sectional view showing the connector according to Embodiment 1 attached to the connection object on the bottom surface of which the flexible conductors are exposed.

Consequently, as shown in FIG. 17, the second and first joint portions 13G and 13E of each contact 13 are separately sandwiched between the +Z direction-side surface of the protrusion portion 16B of the second insulator 16 and the corresponding retaining surfaces 15F and 15G in the recess portion 15D of the first insulator 15. Thus, the contacts 13 are retained by the first insulator 15 and the second insulator 16.

Further, the edge of the connection object F2 and the flat plate portion 13H of the contact 13 are sandwiched between the inner wall surface 15H, which constitutes the first opposed surface, of the recess portion 15D of the first insulator 15 and the outer surface 16G, which constitutes the second opposed surface, of the protrusion portion 16B of the second insulator 16, and the flexible conductor F22 exposed on the bottom surface of the textile F21 of the connection object F2 makes contact with the second contact surface S2B of the contact 13 at a predetermined contact pressure. Thus, the contacts 13 are electrically connected to the flexible conductors F22 of the connection object F2.

Meanwhile, the flat plate portion 13F and the first connection surface S1B connected to the first joint portion 13E of each contact 13 are accommodated in the corresponding part-of-contact accommodating portion 16D of the second insulator 16.

In this way, with the connector 11 according to Embodiment 1, it is possible to attach the connector 11 to either of the connection objects F1 and F2 and electrically connect the contacts 13 to the flexible conductors F12 exposed on the top surface of the textile F11 of the connection object F1 or the flexible conductors F22 exposed on the bottom surface of the textile F21 of the connection object F2 only by changing the posture of the contacts 13 temporarily retained in the first insulator 15 between the first posture and the second posture, with the fitting relationship between the connector 11 and a counter connector being maintained and without a change of any constituent component of the connector 11.

Embodiment 2

Figure 18:
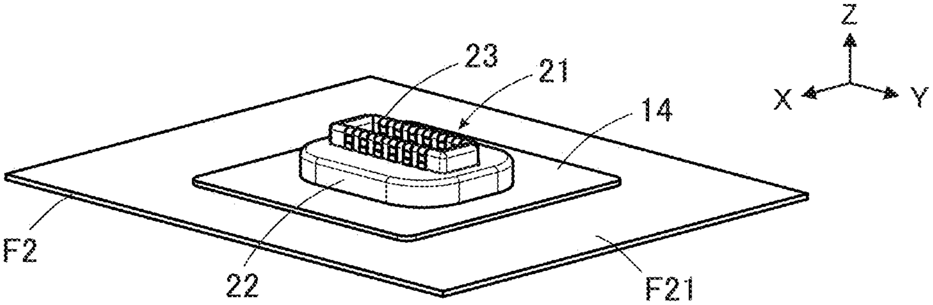
FIG. 18 is a perspective view of a connector according to Embodiment 2 attached to the connection object on the bottom surface of which the flexible conductors are exposed, as viewed from an obliquely upper position.
Figure 19:
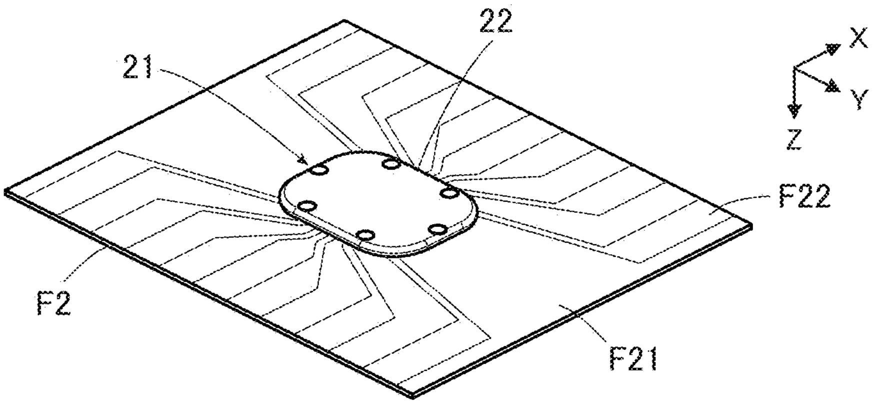
FIG. 19 is a perspective view of the connector according to Embodiment 2 attached to the connection object on the bottom surface of which the flexible conductors are exposed, as viewed from an obliquely lower position.

FIGS. 18 and 19 show a connector 21 according to Embodiment 2. The connector 21 is attached to the connection object F2 and used as a connector for fitting a wearable device. The connector 21 includes a housing 22 made of an insulating material. In the housing 22, a plurality of contacts 23 are aligned in two rows parallel to each other and retained to project perpendicularly to the connection object F2.

The connector 21 is attached to the connection object F2 along with the reinforcing sheet 14 for reinforcing the connection object F2.

The connection object F2 here is identical to the connection object F2 shown in FIGS. 14 and 15, where wiring constituted of the flexible conductors F22 is exposed on the bottom surface, which faces in the −Z direction, of the textile F21 made of an insulating material, and the flexible conductors F22 are not exposed on the top surface, which faces in the +Z direction, of the textile F21.

For convenience, the connection object F2 is defined as extending in an XY plane, the direction in which the contacts 23 are aligned is referred to as “Y direction,” and the direction in which the contacts 23 project is referred to as “+Z direction.”

Figure 20:
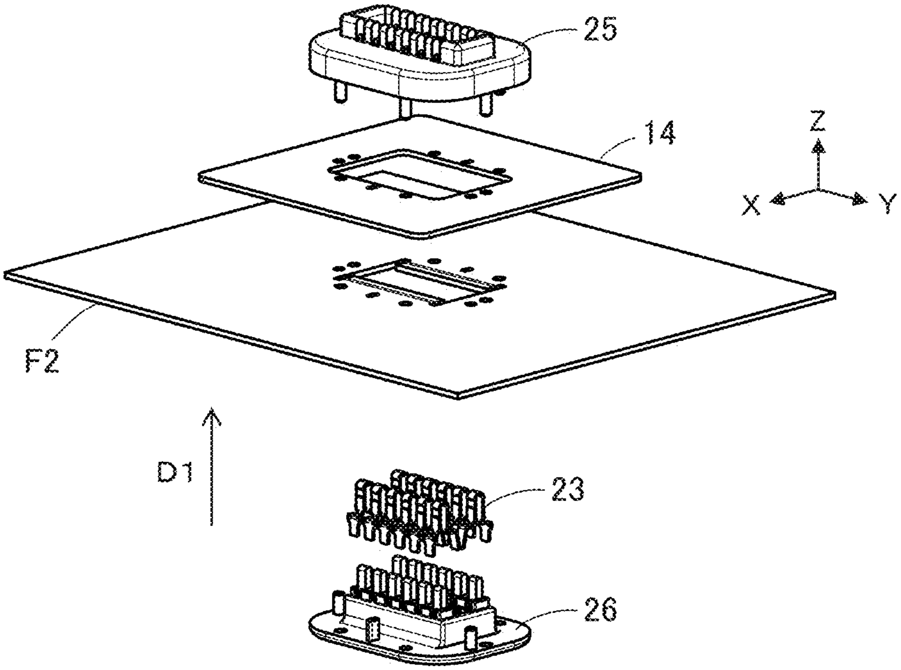
FIG. 20 is an exploded perspective view of the connector according to Embodiment 2.

FIG. 20 is an exploded perspective view of the connector 21. The connector 21 includes a first insulator 25 and a second insulator 26, and these first and second insulators 25 and 26 constitute the housing 22.

The contacts 23 are separately and temporarily retained in the second insulator 26, and the second insulator 26 is assembled to the first insulator 25 in the +Z direction which is the predetermined assembling direction D1, with the second insulator 26 and the first insulator 25 sandwiching the connection object F2 and the reinforcing sheet 14 therebetween.

Figure 21:
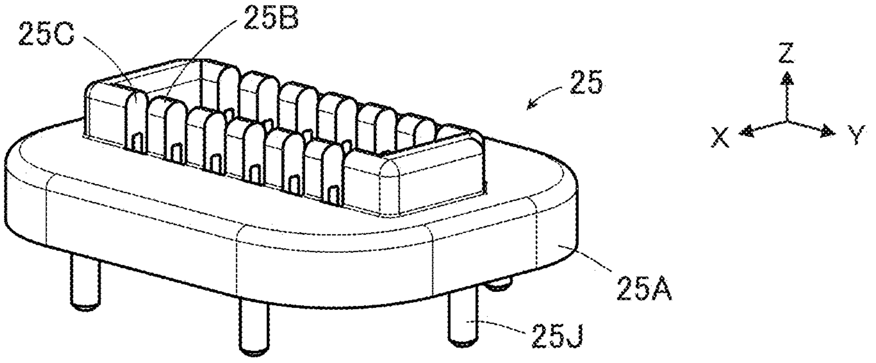
FIG. 21 is a perspective view of a first insulator used in the connector according to Embodiment 2, as viewed from an obliquely upper position.
Figure 22:
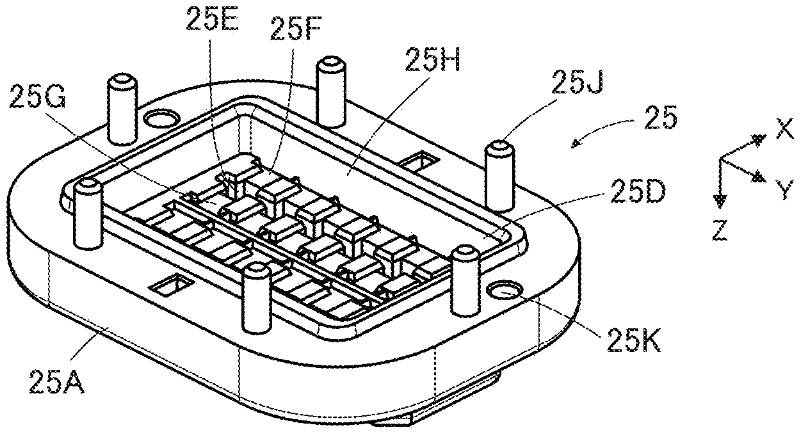
FIG. 22 is a perspective view of the first insulator used in the connector according to Embodiment 2, as viewed from an obliquely lower position.

As shown in FIGS. 21 and 22, the first insulator 25 includes a base portion 25A of flat plate shape extending in an XY plane and a plurality of projection portions 25B projecting in the +Z direction from the base portion 25A and arranged in a frame shape. A gap 25C is formed between each adjacent pair of projection portions 25B.

A recess portion 25D of rectangular shape that opens in the −Z direction is formed at the −Z direction-side surface of the base portion 25A, and the bottom of the recess portion 25D is provided with a plurality of through-holes 25E penetrating from the corresponding gaps 25C on the +Z direction side of the base portion 25A to the recess portion 25D. The through-holes 25E correspond to the contacts 23 and form a first row in which some through-holes 25E are aligned in the Y direction along the +X direction-side edge of the recess portion 25D and a second row in which the other through-holes 25E are aligned in the Y direction along the −X direction-side edge of the recess portion 25D.

The bottom of the recess portion 25D is provided with retaining surfaces 25F and 25G of flat shape that extend in an XY plane on the opposite sides, in the X direction, of the respective through-holes 25E. For each of the through-holes 25E aligned in the Y direction along the +X direction-side edge of the recess portion 25D in the first row, the retaining surface 25F is situated on the +X direction side of the through-hole 25E, while the retaining surface 25G is situated on the −X direction side thereof. For each of the through-holes 25E aligned in the Y direction along the −X direction-side edge of the recess portion 25D in the second row, the retaining surface 25F is situated on the −X direction side of the through-hole 25E, while the retaining surface 25G is situated on the +X direction side thereof.

In other words, of the retaining surfaces 25F and 25G formed on the opposite sides, in the X direction, of each through-hole 25E, the retaining surface 25F is situated in the vicinity of an inner wall surface 25H of the recess portion 25D and reaches the inner wall surface 25H. The inner wall surface 25H of the recess portion 25D constitutes the first opposed surface extending in the z direction that is the fitting direction.

The recess portion 25D is formed to have a width in the X direction larger than that of the opening of the connection object F2.

Further, the −Z direction-side surface of the base portion 25A is provided with a plurality of fixing posts 25J projecting in the −Z direction and a plurality of fixing holes 25K extending in the +Z direction.

Figure 23:
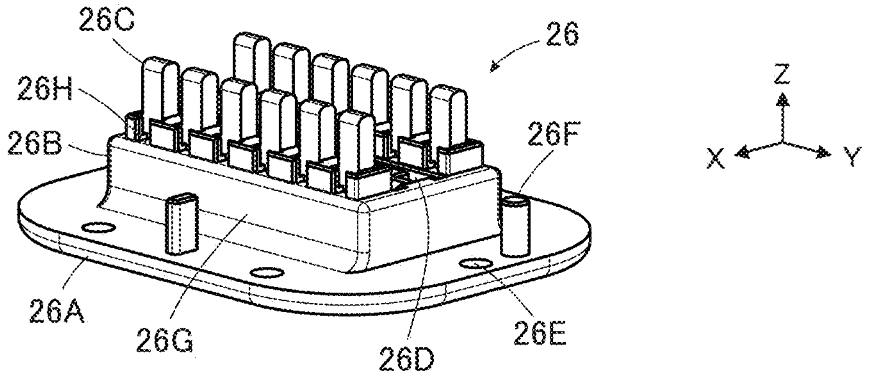
FIG. 23 is a perspective view of a second insulator used in the connector according to Embodiment 2, as viewed from an obliquely upper position.
Figure 24:
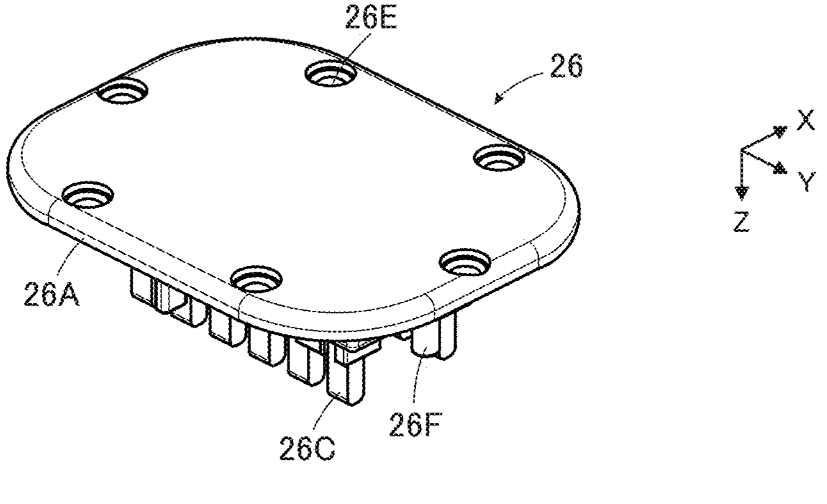
FIG. 24 is a perspective view of the second insulator used in the connector according to Embodiment 2, as viewed from an obliquely lower position.

As shown in FIGS. 23 and 24, the second insulator 26 includes a base portion 26A of flat plate shape extending in an XY plane, a protrusion portion 26B of rectangular cuboid shape situated in the center of the base portion 26A and protruding in the +Z direction from the base portion 26A, and a plurality of columnar members 26C projecting in the +Z direction from the protrusion portion 26B.

The protrusion portion 26B is to be inserted into the recess portion 25D of the first insulator 25 in the process of attaching the connector 21 to the connection object F2, and has a size slightly smaller than that of the recess portion 25D.

The columnar members 26C correspond to the contacts 23 and form a first row in which some columnar members 26C are aligned in the Y direction along the +X direction-side edge of the protrusion portion 26B and a second row in which the other columnar members 26C are aligned in the Y direction along the −X direction-side edge of the protrusion portion 26B.

The protrusion portion 26B is provided with a plurality of part-of-contact accommodating portions 26D of recess shape extending in the −Z direction separately on the −X direction side of the columnar members 26C forming the first row and on the +X direction side of the columnar members 26C forming the second row.

The base portion 26A is provided with a plurality of through-holes 26E situated around the protrusion portion 26B and penetrating through the base portion 26A in the Z direction and a plurality of fixing posts 26F projecting in the +Z direction.

An outer surface 26G of the protrusion portion 26B constitutes the second opposed surface extending in the Z direction that is the fitting direction.

The surface of the protrusion portion 26B which faces in the +Z direction is provided with shoulder portions 26H each extending from the columnar members 26C up to the outer surface 26G of the protrusion portion 26B situated on the side close to those columnar members 26C.

Figure 25:
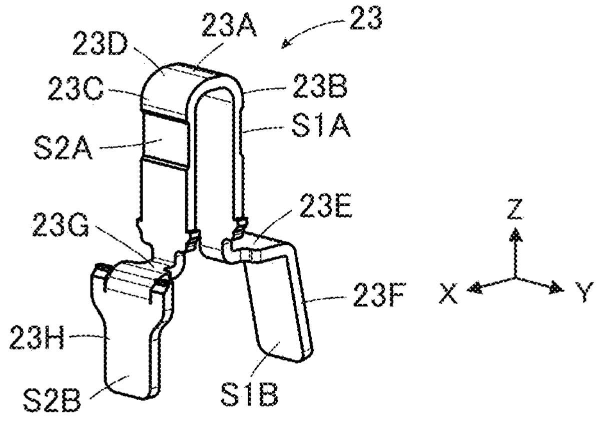
FIG. 25 is a perspective view of a contact used in the connector according to Embodiment 2, as viewed from an obliquely upper position.
Figure 26:
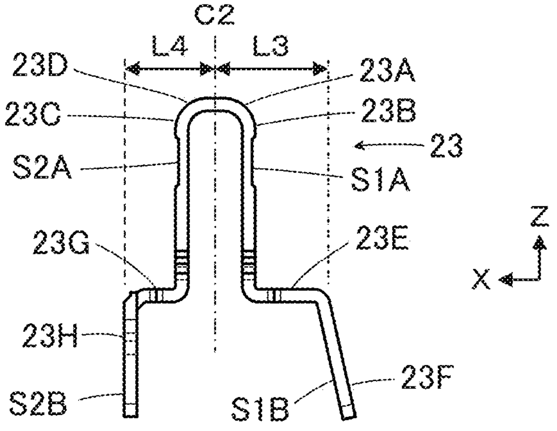
FIG. 26 is a side view showing the contact used in the connector according to Embodiment 2.

FIGS. 25 and 26 show the structure of each of the contacts 23 aligned on the +X direction side, of the plurality of contacts 23 shown in FIG. 20.

The contact 23 is constituted of a band-like member made of a conductive material such as metal and includes a U-shaped portion 23A extending in the Z direction and bent in a U shape. The U-shaped portion 23A is composed of a pair of extension portions 23B and 23C extending along a YZ plane and facing each other in the X direction and a top portion 23D connecting the +Z directional ends of the extension portions 23B and 23C to each other.

The −Z directional end of the extension portion 23B is connected, via a first joint portion 23E extending along an XY plane, to a flat plate portion 23F extending while being inclined toward the −X direction side with respect to a YZ plane. The −Z directional end of the extension portion 23C is connected to a flat plate portion 23H extending along a YZ plane via a second joint portion 23G extending along an XY plane.

The first joint portion 23E has an X directional length substantially the same as that of the retaining surface 25F in the recess portion 25D of the first insulator 25 shown in FIG. 22. The second joint portion 23G has an X directional length smaller than that of the first joint portion 23E and substantially the same as that of the shoulder portion 26H extending from the columnar members 26C up to the outer surface 26G of the protrusion portion 26B in the second insulator 26.

The outer surface of the extension portion 23B on the −X direction side and the outer surface of the extension portion 23C on the +X direction side respectively form the first contact surface S1A and the second contact surface S2A for making contact with a contact of a counter connector.

The +X direction-side surface of the −Z directional end of the flat plate portion 23H forms the second connection surface S2B that is to make contact with the flexible conductor F22 of the connection object F2. Similarly, the +X direction-side surface of the −Z directional end of the flat plate portion 23F forms the first connection surface S1B that is to make contact with the flexible conductor F12 of the connection object F1, which will be described later. The first connection surface S1B and the second connection surface S2B do not face the opposite directions but face substantially the same direction.

As shown in FIG. 26, when viewed from the Y direction, the U-shaped portion 23A has a center line C2 extending in the Z direction, and the first and second contact surfaces S1A and S2A are situated symmetrically with respect to the centerline C2.

In contrast, the first and second connection surfaces S1B and S2B are situated asymmetrically with respect to the centerline C2. In other words, the X directional length of the second joint portion 23G is smaller than that of the first joint portion 23E, and accordingly, an X directional distance L4 from the centerline C2 to the second connection surface S2B is shorter than an X directional distance L3 from the centerline C2 to the +Z directional end of the flat plate portion 23F provided with the first connection surface S1B.

Note that, of the plurality of contacts 23 shown in FIG. 20, the contacts 23 aligned on the −X direction side have the same structure as that of the contact 23 shown in FIGS. 25 and 26 but are disposed in the opposite orientation therefrom in the X direction.

Figure 27:
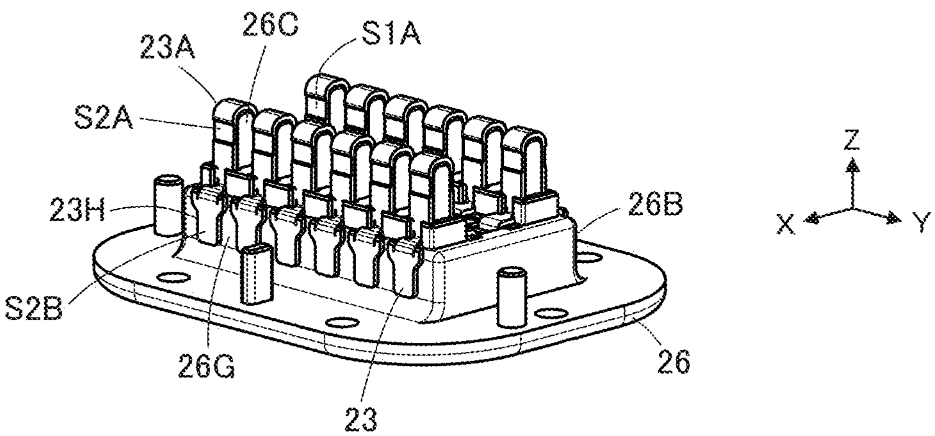
FIG. 27 is a perspective view of the second insulator of Embodiment 2 in which the contacts are temporarily retained, as viewed from an obliquely upper position.
Figure 28:
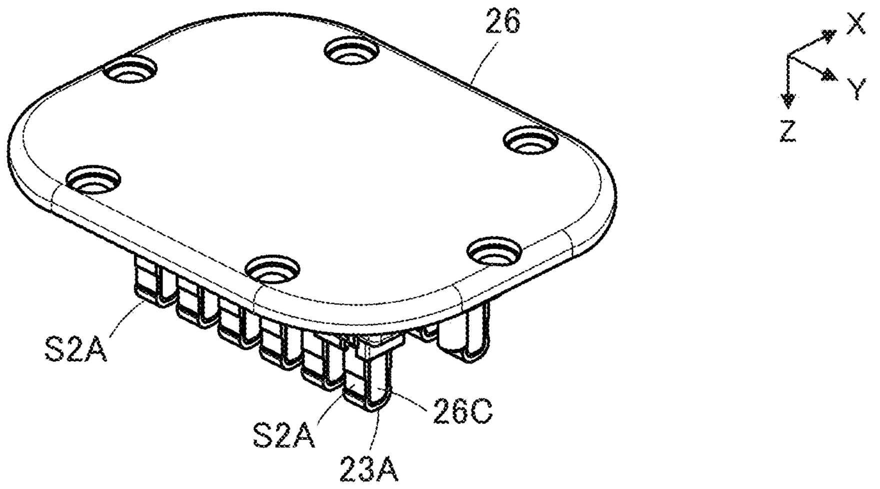
FIG. 28 is a perspective view of the second insulator of Embodiment 2 in which the contacts are temporarily retained, as viewed from an obliquely lower position.

In the process of attaching the connector 21 to the connection object F2, first, the respective contacts 23 are pushed into the second insulator 26 from the +Z direction toward the −Z direction, whereby the contacts 23 are temporarily retained in the second insulator 26 as shown in FIGS. 27 and 28. In this process, the columnar members 26C of the second insulator 26 are each inserted into the inside of the U-shaped portion 23A of the corresponding contact 23.

While the contacts 23 are aligned in two rows, i.e., the row on the +X direction side and the row on the −X direction side, the contacts 23 constituting the respective rows may be produced to be joined to one carrier (not shown) so that all of the contacts 23 can be moved and temporarily retained in the second insulator 26 at a time by use of the carrier. The carrier is cut and removed from the contacts 23 after all of the contacts 23 constituting the respective rows are moved and temporarily retained.

As described above, the second joint portion 23G of the contact 23 has an X directional length substantially the same as that of the shoulder portion 26H extending from the columnar members 26C up to the outer surface 26G of the protrusion portion 26B in the second insulator 26. Accordingly, the flat plate portion 23H connected to the second joint portion 23G of the contact 23 contacts or faces the outer surface 26G of the protrusion portion 26B of the second insulator 26, and the second connection surface S2B faces the opposite side from the protrusion portion 26B.

Now, after the reinforcing sheet 14 and the connection object F2 are placed on the −Z direction side of the first insulator 25, the second insulator 26 is moved in the +Z direction to start the assembly thereof into the first insulator 25.

Figure 29:
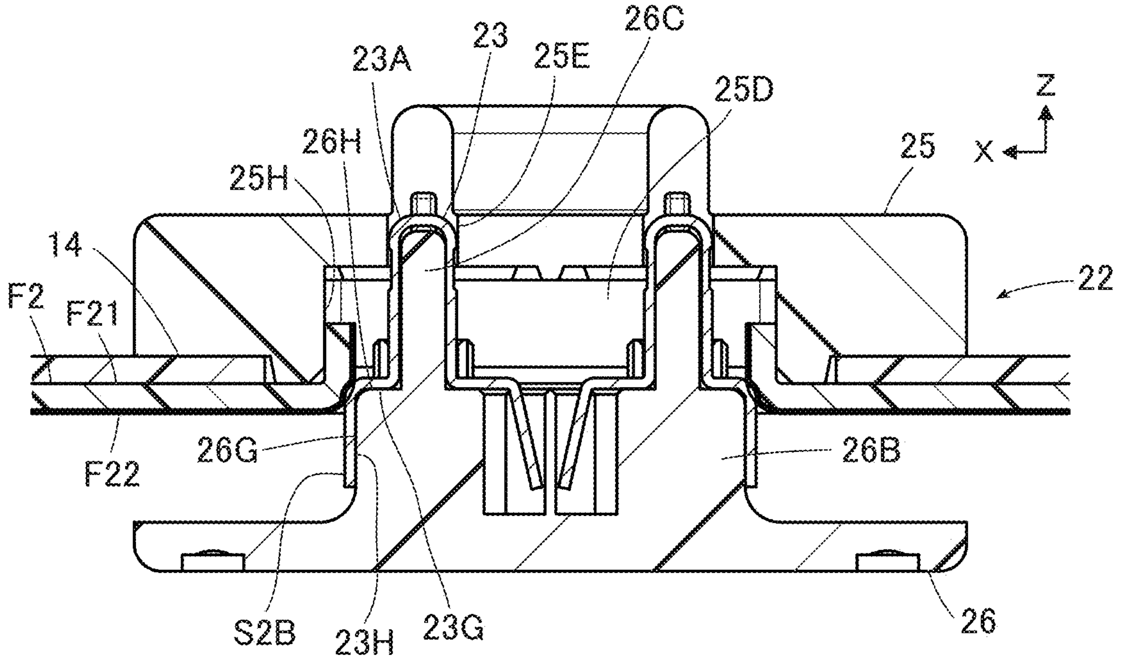
FIG. 29 is a cross-sectional view showing the connector according to Embodiment 2 in the process of attaching the connector to the connection object on the bottom surface of which the flexible conductors are exposed.

At this time, as shown in FIG. 29, the U-shaped portions 23A of the contacts 23 are, together with the columnar members 26C of the second insulator 26, inserted into the corresponding through-holes 25E from the recess portion 25D of the first insulator 25.

Further, the protrusion portion 26B of the second insulator 26 is inserted into the recess portion 25D of the first insulator 25 from the −Z direction. At this time, since the second joint portion 23G of the contact 23 has an X directional length smaller than that of the retaining surface 25F of the first insulator 25, a gap is formed between the flat plate portion 23H of the contact 23 and the inner wall surface 25H of the recess portion 25D of the first insulator 25, and the edge of the connection object F2 is pushed while being bent toward the +Z direction by the protrusion portion 26B of the second insulator 26 and thereby enters the gap.

Figure 30:
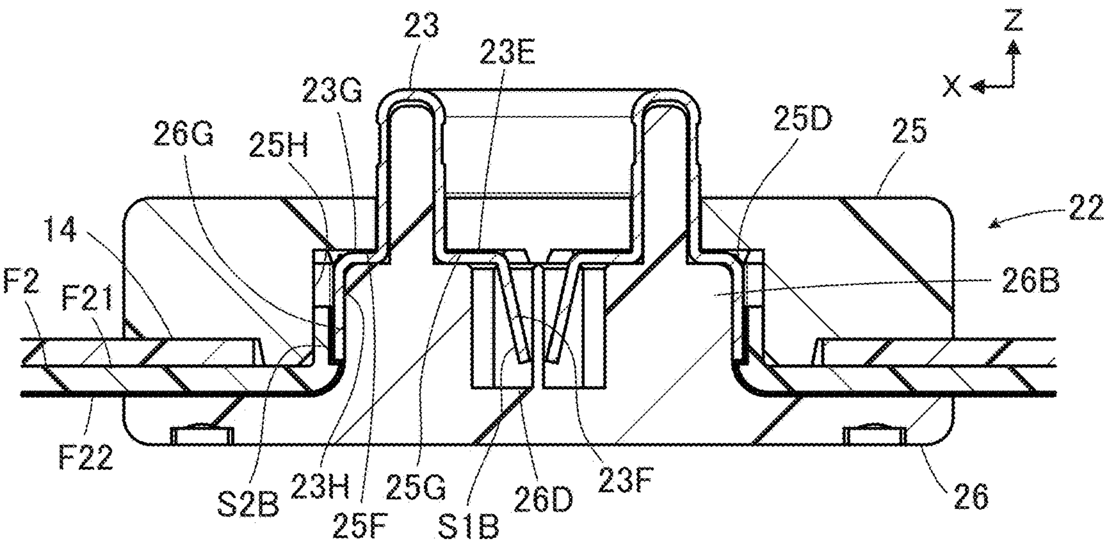
FIG. 30 is a cross-sectional view showing the connector according to Embodiment 2 attached to the connection object on the bottom surface of which the flexible conductors are exposed.

In this state, when the second insulator 26 is moved toward the first insulator 25 in the +Z direction, as shown in FIG. 30, the second and first joint portions 23G and 23E of each contact 23 are separately sandwiched between the +Z direction-side surface of the protrusion portion 26B of the second insulator 26 and the corresponding retaining surfaces 25F and 25G in the recess portion 25D of the first insulator 25. Thus, the contacts 23 are retained by the first insulator 25 and the second insulator 26.

Further, the edge of the connection object F2 and the flat plate portion 23H of the contact 23 are sandwiched between the inner wall surface 25H, which constitutes the first opposed surface, of the recess portion 25D of the first insulator 25 and the outer surface 26G, which constitutes the second opposed surface, of the protrusion portion 26B of the second insulator 26, and the flexible conductor F22 exposed on the bottom surface of the textile F21 of the connection object F2 makes contact with the second contact surface S2B of the contact 23 at a predetermined contact pressure. Thus, the contacts 23 are electrically connected to the flexible conductors F22 of the connection object F2.

The flat plate portion 23F and the first connection surface S1B connected to the first joint portion 23E of each contact 23 are accommodated in the corresponding part-of-contact accommodating portion 26D of the second insulator 26.

The fixing posts 25J of the first insulator 25 are passed through the corresponding through-holes 26E of the second insulator 26 and project on the −Z direction side of the second insulator 26, while the fixing posts 26F of the second insulator 26 are inserted into the corresponding fixing holes 25K of the first insulator 25.

The −Z directional ends of the fixing posts 25J of the first insulator 25 that project on the −Z direction side of the second insulator 26 are heated and deformed whereby the second insulator 26 is fixed with respect to the first insulator 25.

Thus, attachment of the connector 21 to the connection object F2 is completed as shown in FIG. 18.

The posture of the contact 23 thus retained in the housing 22 constituted of the first and second insulators 25 and 26 such that the second and first joint portions 23G and 23E of the contact 23 make contact with the retaining surfaces 25F and 25G in the recess portion 25D of the first insulator 25, respectively, as shown in FIG. 30 is called "second posture."

Figure 31:
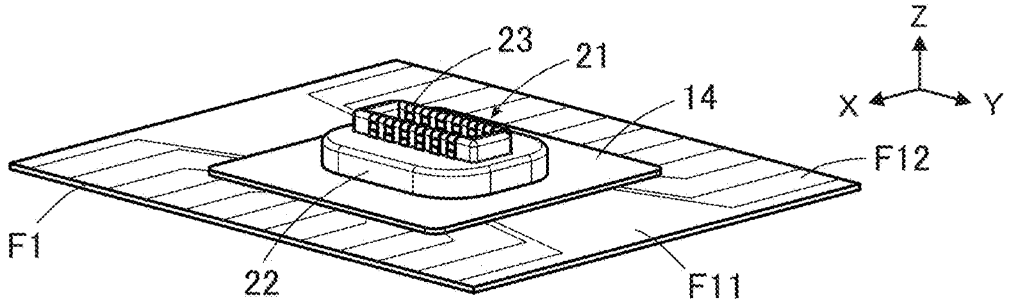
FIG. 31 is a perspective view of the connector according to Embodiment 2 attached to the connection object on the top surface of which the flexible conductors are exposed, as viewed from an obliquely upper position.
Figure 32:
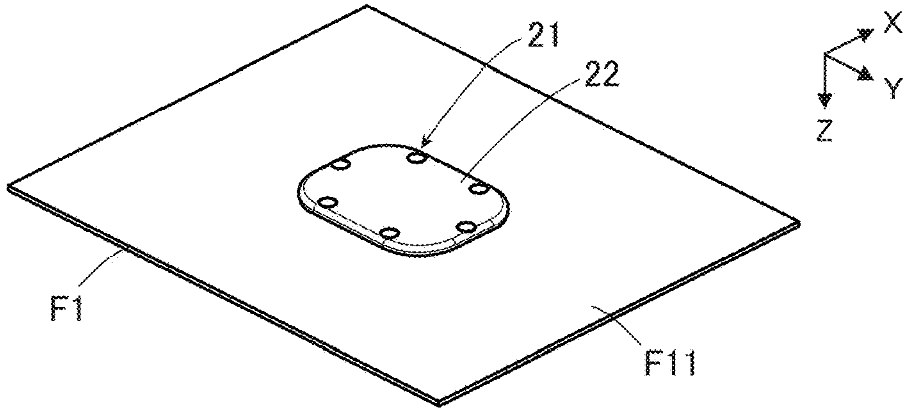
FIG. 32 is a perspective view of the connector according to Embodiment 2 attached to the connection object on the top surface of which the flexible conductors are exposed, as viewed from an obliquely lower position.

Also with the connector 21 according to Embodiment 2, the connector 21 can be attached to the connection object F1 having wiring constituted of the flexible conductors F12 being exposed on the top surface, which faces in the +Z direction, of the textile F11 as shown in FIGS. 31 and 32 only by changing the posture of the contacts 23 retained by the housing 22.

Figure 33:
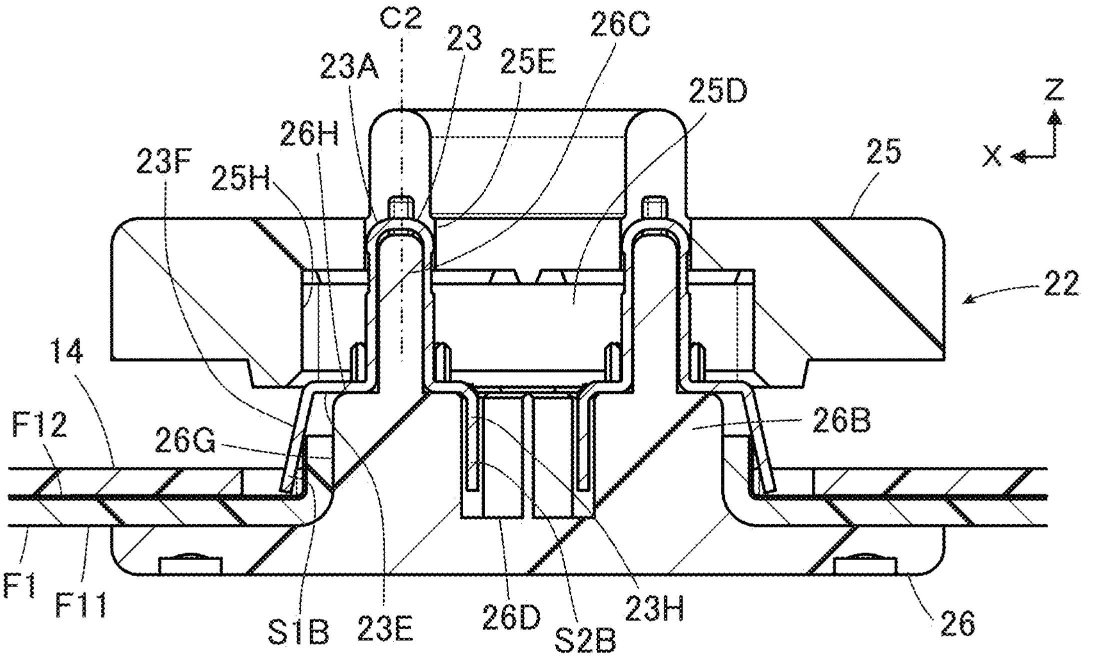
FIG. 33 is a cross-sectional view showing the connector according to Embodiment 2 in the process of attaching the connector to the connection object on the top surface of which the flexible conductors are exposed.

The connector 21 in the process of attachment to the connection object F1 is shown in FIG. 33. Compared to the second posture shown in FIG. 30, the posture of the contact 23 is inverted 180 degrees therefrom around the centerline C2 of the U-shaped portion 23A extending in the Z direction, and this posture is called "first posture."

In the first posture, the flat plate portion 23H and the second connection surface S2B of the contact 23 are accommodated in the part-of-contact accommodating portion 26D of the second insulator 26, the flat plate portion 23F of the contact 23 is situated close to the inner wall surface 25H of the recess portion 25D of the first insulator 25, and the first connection surface S1B faces the opposite side from the inner wall surface 25H.

As described above, the first joint portion 23E of the contact 23 has an X directional length larger than that of the shoulder portion 26H of the second insulator 26, and the flat plate portion 23F connected to the first joint portion 23E is inclined with respect to a YZ plane. Accordingly, when the contact 23 is temporarily retained in the second insulator 26 in the first posture, the flat plate portion 23F makes no contact with the outer surface 26G of the protrusion portion 26B of the second insulator 26, and a predetermined gap is formed between the second connection surface S1B and the outer surface 26G.

The edge of the connection object F1 is bent toward the +Z direction and inserted between the outer surface 26G of the protrusion portion 26B of the second insulator 26 and the second contact surface S1B of the contact 23.

In this state, when the second insulator 26 is moved toward the first insulator 25 in the +Z direction, the U-shaped portions 23A of the contacts 23 are, together with the columnar members 26C of the second insulator 26, inserted into the corresponding through-holes 25E from the recess portion 25D of the first insulator 25.

Further, owing to the protrusion portion 26B of the second insulator 26, the flat plate portion 23F of each contact 23 is forced to enter the recess portion 25D of the first insulator 25 while being displaced.

Figure 34:
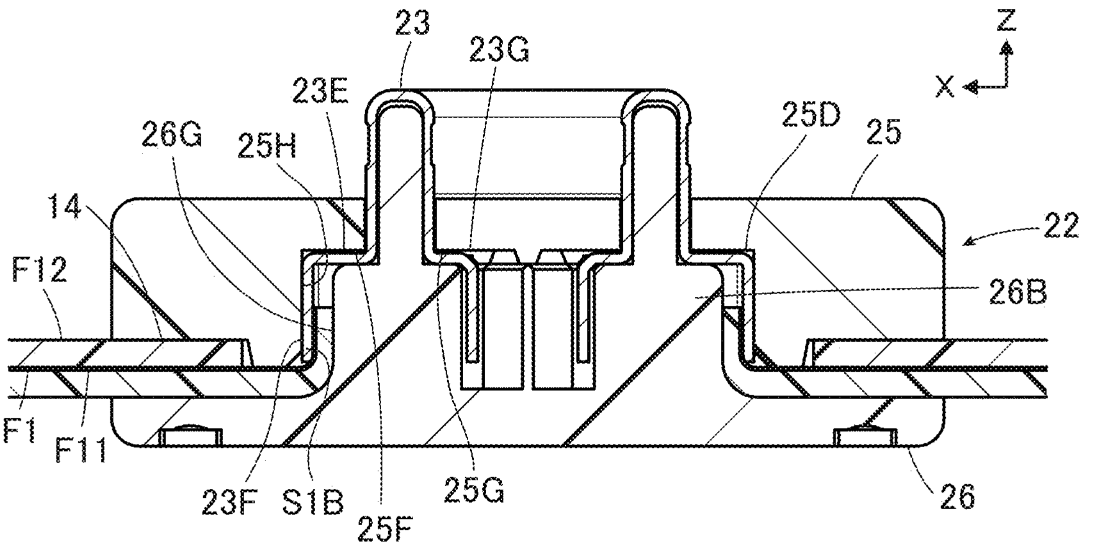
FIG. 34 is a cross-sectional view showing the connector according to Embodiment 2 attached to the connection object on the top surface of which the flexible conductors are exposed.

Consequently, as shown in FIG. 34, the first and second joint portions 23E and 23G of each contact 23 are each sandwiched between the +Z direction-side surface of the protrusion portion 26B of the second insulator 26 and the corresponding one of the retaining surfaces 25F and 25G in the recess portion 25D of the first insulator 25, and the contacts 23 are retained by the first insulator 25 and the second insulator 26.

Further, the edge of the connection object F1 and the flat plate portion 23F of the contact 23 are sandwiched between the inner wall surface 25H, which constitutes the first opposed surface, of the recess portion 25D of the first insulator 25 and the outer surface 26G, which constitutes the second opposed surface, of the protrusion portion 26B of the second insulator 26, and the flexible conductor F12 exposed on the top surface of the textile F11 of the connection object F1 makes contact with the first connection surface S1B of the contact 23 at a predetermined contact pressure. Thus, the contacts 23 are electrically connected to the flexible conductors F12 of the connection object F1.

In this way, with the connector 21 according to Embodiment 2, it is possible to attach the connector 21 to either of the connection objects F2 and F1 and electrically connect the contacts 23 to the flexible conductors F22 exposed on the bottom surface of the textile F21 of the connection object F2 or the flexible conductors F12 exposed on the top surface of the textile F11 of the connection object F1 only by changing the posture of the contacts 23 temporarily retained in the second insulator 26 between the second posture and the first posture, with the fitting relationship between the connector 21 and a counter connector being maintained and without a change of any constituent component of the connector 21.

Embodiment 3

Figure 35:
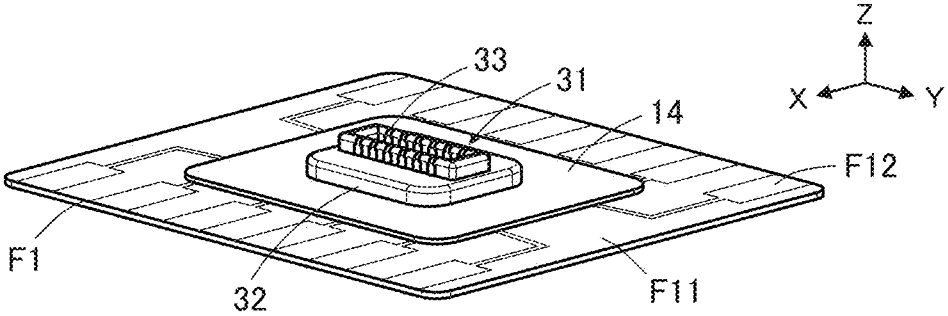
FIG. 35 is a perspective view of a connector according to Embodiment 3 attached to the connection object on the top surface of which the flexible conductors are exposed, as viewed from an obliquely upper position.
Figure 36:
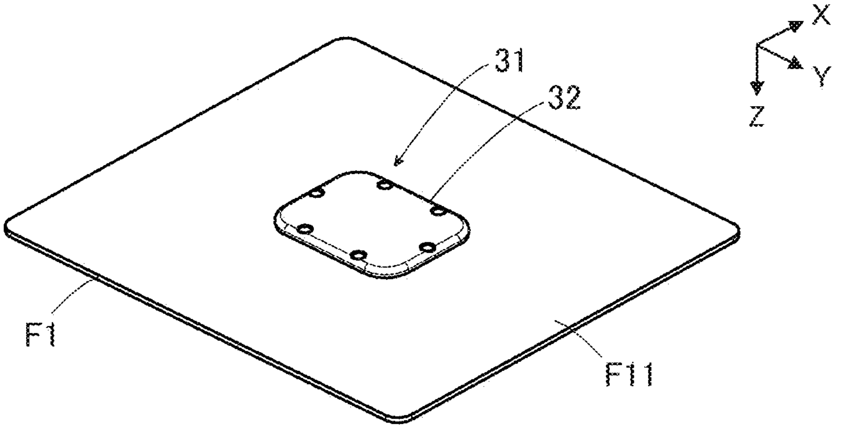
FIG. 36 is a perspective view of the connector according to Embodiment 3 attached to the connection object on the top surface of which the flexible conductors are exposed, as viewed from an obliquely lower position.

FIGS. 35 and 36 show a connector 31 according to Embodiment 3. The connector 31 is attached to the connection object F1 and used as a connector for fitting a wearable device. The connector 31 includes a housing 32 made of an insulating material. In the housing 32, a plurality of contacts 33 are aligned in two rows parallel to each other and retained to project perpendicularly to the connection object F1.

The connector 31 is attached to the connection object F1 along with the reinforcing sheet 14 for reinforcing the connection object F1.

The connection object F1 here is identical to the connection object F1 shown in FIGS. 1 and 2, where wiring constituted of the flexible conductors F12 is exposed on the top surface, which faces in the +Z direction, of the textile F11 made of an insulating material, and the flexible conductors F12 are not exposed on the bottom surface, which faces in the −Z direction, of the textile F11.

For convenience, the connection object F1 is defined as extending in an XY plane, the direction in which the contacts 33 are aligned is referred to as "Y direction," and the direction in which the contacts 33 project is referred to as "+Z direction."

Figure 37:
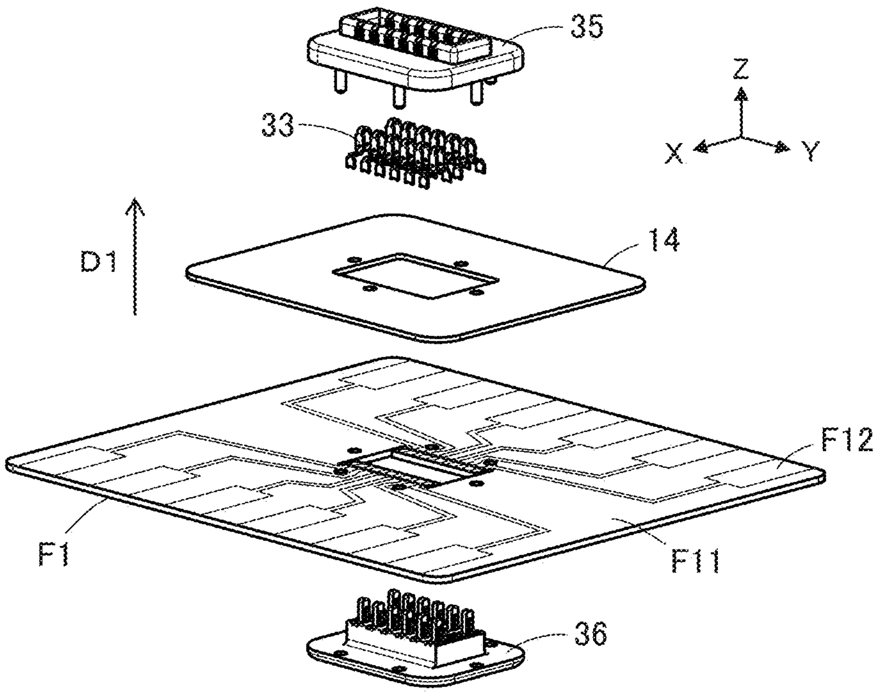
FIG. 37 is an exploded perspective view of the connector according to Embodiment 3.

FIG. 37 is an exploded perspective view of the connector 31. The connector 31 includes a first insulator 35 and a second insulator 36, and these first and second insulators 35 and 36 constitute the housing 32.

The contacts 33 are temporarily retained in the first insulator 35, and the second insulator 36 is assembled to the first insulator 35 in the +Z direction which is the predetermined assembling direction D1, with the second insulator 36 and the first insulator 35 sandwiching the connection object F1 and the reinforcing sheet 14 therebetween.

Figure 38:
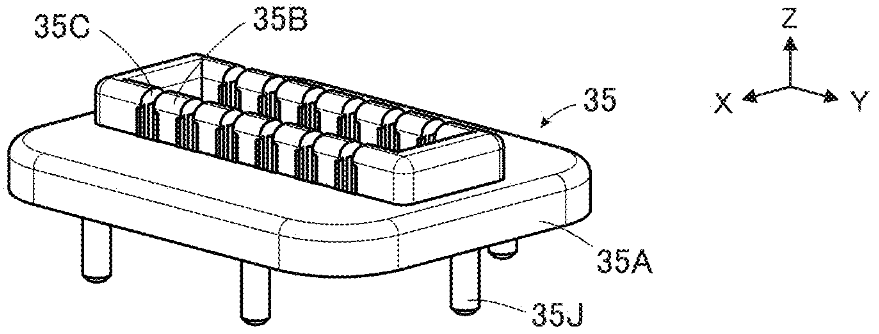
FIG. 38 is a perspective view of a first insulator used in the connector according to Embodiment 3, as viewed from an obliquely upper position.
Figure 39:
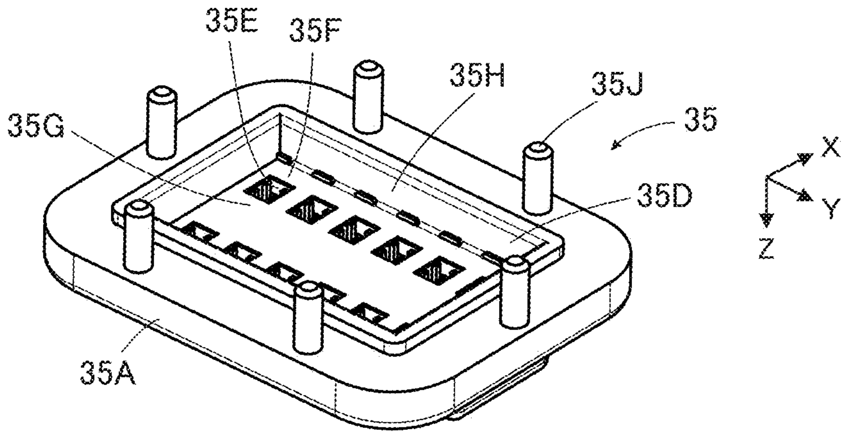
FIG. 39 is a perspective view of the first insulator used in the connector according to Embodiment 3, as viewed from an obliquely lower position.

As shown in FIGS. 38 and 39, the first insulator 35 includes a base portion 35A of flat plate shape extending in an XY plane and a plurality of projection portions 35B projecting in the +Z direction from the base portion 35A and arranged in a frame shape. A gap 35C is formed between each adjacent pair of projection portions 35B.

A recess portion 35D of rectangular shape that opens in the −Z direction is formed at the −Z direction-side surface of the base portion 35A, and the bottom of the recess portion 35D is provided with a plurality of through-holes 35E penetrating from the corresponding gaps 35C on the +Z direction side of the base portion 35A to the recess portion 35D. The through-holes 35E correspond to the contacts 33 and form a first row in which some through-holes 35E are aligned in the Y direction along the +X direction-side edge of the recess portion 35D and a second row in which the other through-holes 35E are aligned in the Y direction along the −X direction-side edge of the recess portion 35D.

The bottom of the recess portion 35D is provided with retaining surfaces 35F and 35G of flat shape that extend in an XY plane on the opposite sides, in the X direction, of the respective through-holes 35E. For each of the through-holes 35E aligned in the Y direction along the +X direction-side edge of the recess portion 35D in the first row, the retaining surface 35F is situated on the +X direction side of the through-hole 35E, while the retaining surface 35G is situated on the −X direction side thereof. For each of the through-holes 35E aligned in the Y direction along the −X direction-side edge of the recess portion 35D in the second row, the retaining surface 35F is situated on the −X direction side of the through-hole 35E, while the retaining surface 35G is situated on the +X direction side thereof.

In other words, of the retaining surfaces 35F and 35G formed on the opposite sides, in the X direction, of each through-hole 35E, the retaining surface 35F is situated in the vicinity of an inner wall surface 35H of the recess portion 35D and reaches the inner wall surface 35H. The inner wall surface 35H of the recess portion 35D constitutes the first opposed surface extending in the Z direction that is the fitting direction.

Further, the −Z direction-side surface of the base portion 35A is provided with a plurality of fixing posts 35J projecting in the −Z direction.

Figure 40:
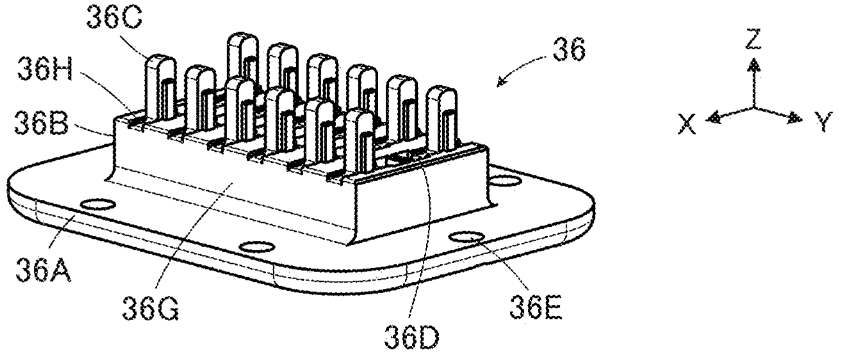
FIG. 40 is a perspective view of a second insulator used in the connector according to Embodiment 3, as viewed from an obliquely upper position.
Figure 41:
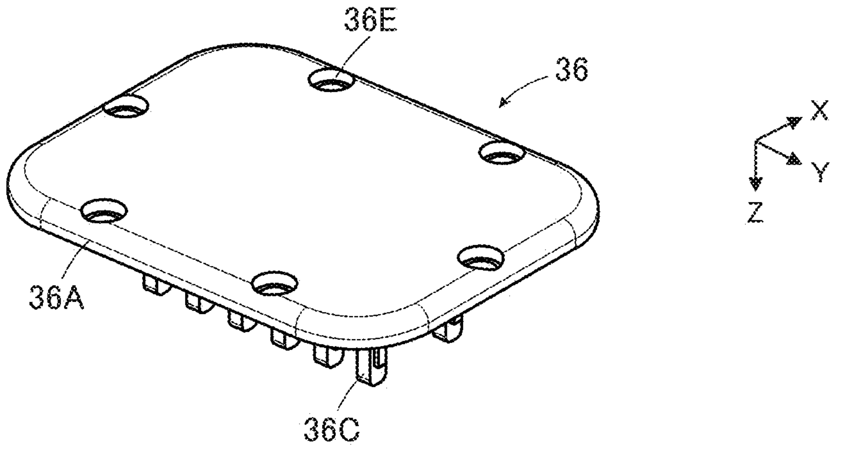
FIG. 41 is a perspective view of the second insulator used in the connector according to Embodiment 3, as viewed from an obliquely lower position.

As shown in FIGS. 40 and 41, the second insulator 36 includes a base portion 36A of flat plate shape extending in an XY plane, a protrusion portion 36B of rectangular cuboid shape situated in the center of the base portion 36A and protruding in the +Z direction from the base portion 36A, and a plurality of columnar members 36C projecting in the +Z direction from the protrusion portion 36B.

The protrusion portion 36B is to be inserted into the recess portion 35D of the first insulator 35 in the process of attaching the connector 31 to the connection object F1, and has a size slightly smaller than that of the recess portion 35D.

The columnar members 36C correspond to the contacts 33 and form a first row in which some columnar members 36C are aligned in the Y direction along the +X direction-side edge of the protrusion portion 36B and a second row in which the other columnar members 36C are aligned in the Y direction along the −X direction-side edge of the protrusion portion 36B.

The protrusion portion 36B is provided with a plurality of part-of-contact accommodating portions 36D of recess shape extending in the −Z direction separately on the −X direction side of the columnar members 36C forming the first row and on the +X direction side of the columnar members 36C forming the second row.

The base portion 36A is provided with a plurality of through-holes 36E situated around the protrusion portion 36B and penetrating through the base portion 36A in the Z direction.

An outer surface 36G of the protrusion portion 36B constitutes the second opposed surface extending in the Z direction that is the fitting direction.

The surface of the protrusion portion 36B which faces in the +Z direction is provided with shoulder portions 36H each extending from the columnar members 36C up to the outer surface 36G of the protrusion portion 36B situated on the side close to those columnar members 36C.

Figure 42:
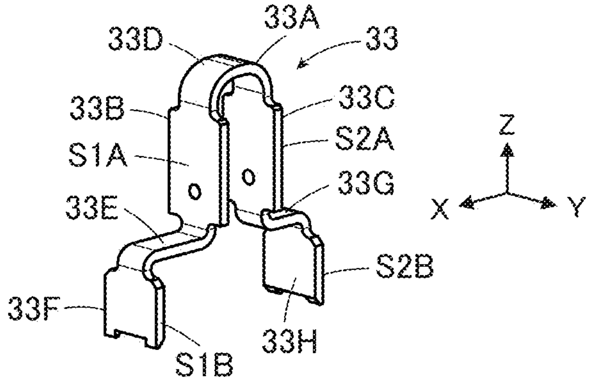
FIG. 42 is a perspective view of a contact used in the connector according to Embodiment 3, as viewed from an obliquely upper position.
Figure 43:
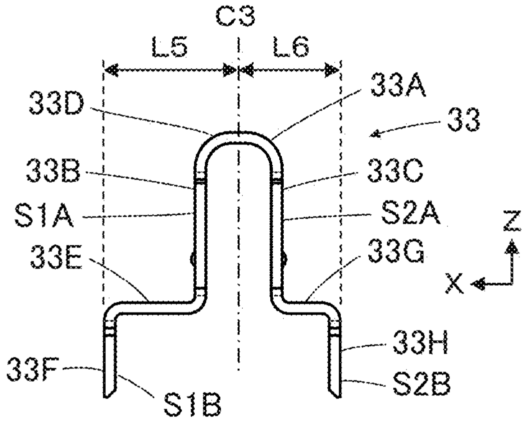
FIG. 43 is a side view showing the contact used in the connector according to Embodiment 3.

FIGS. 42 and 43 show the structure of each of the contacts 33 aligned on the +X direction side, of the plurality of contacts 33 shown in FIG. 37.

The contact 33 is constituted of a band-like member made of a conductive material such as metal and includes a U-shaped portion 33A extending in the Z direction and bent in a U shape. The U-shaped portion 33A is composed of a pair of extension portions 33B and 33C extending along a YZ plane and facing each other in the X direction and a top portion 33D connecting the +Z directional ends of the extension portions 33B and 33C to each other. The −Z directional end of the extension portion 33B is connected to a flat plate portion 33F extending along a YZ plane via a first joint portion 33E extending along an XY plane. The −Z directional end of the extension portion 33C is connected to a flat plate portion 33H extending along a YZ plane via a second joint portion 33G extending along an XY plane.

The outer surface of the extension portion 33B on the +X direction side and the outer surface of the extension portion 33C on the −X direction side respectively form the first contact surface S1A and the second contact surface S2A for making contact with a contact of a counter connector.

The −X direction-side surface of the −Z directional end of the flat plate portion 33F forms the first connection surface S1B that is to make contact with the flexible conductor F12 of the connection object F1. Similarly, the −X direction-side surface of the −Z directional end of the flat plate portion 33H forms the second connection surface S2B that is to make contact with the flexible conductor F22 of the connection object F2, which will be described later. Thus, the first connection surface S1B and the second connection surface S2B do not face the opposite directions but face substantially the same direction.

As shown in FIG. 43, when viewed from the Y direction, the U-shaped portion 33A has a center line C3 extending in the Z direction, and the first and second contact surfaces S1A and S2A are situated symmetrically with respect to the centerline C3.

In contrast, the first and second connection surfaces S1B and S2B are situated asymmetrically with respect to the centerline C3. In other words, the X directional length of the second joint portion 33G is set smaller than that of the first joint portion 33E, and an X directional distance L6 from the centerline C3 to the second connection surface S2B is shorter than an X directional distance L5 from the centerline C3 to the first connection surface S1B.

The first joint portion 33E has an X directional length substantially the same as that of the retaining surface 35F in the recess portion 35D of the first insulator 35 shown in FIG. 39. Meanwhile, the second joint portion 33G has an X directional length smaller than that of the first joint portion 33E and substantially the same as that of the shoulder portion 36H extending from the columnar members 36C up to the outer surface 36G of the protrusion portion 36B in the second insulator 36.

Of the plurality of contacts 33 shown in FIG. 37, the contacts 33 aligned on the −X direction side have the same structure as that of the contact 33 shown in FIGS. 42 and 43 but are disposed in the opposite orientation therefrom in the X direction.

Figure 44:
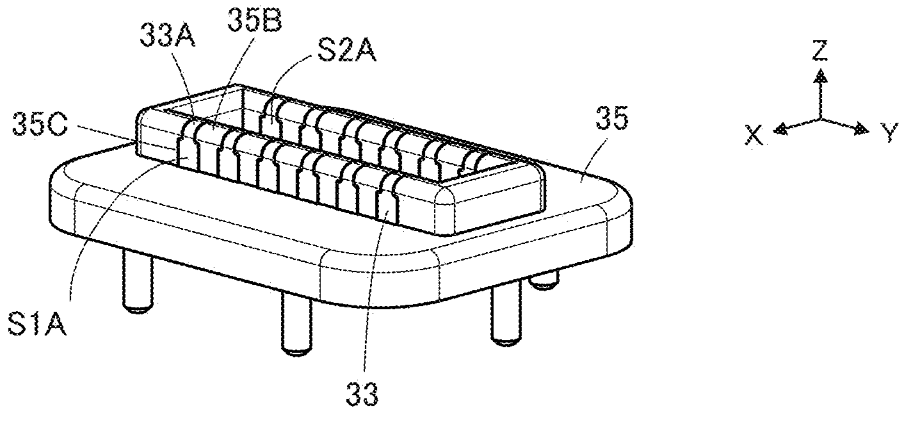
FIG. 44 is a perspective view of the first insulator of Embodiment 3 in which the contacts are temporarily retained, as viewed from an obliquely upper position.
Figure 45:
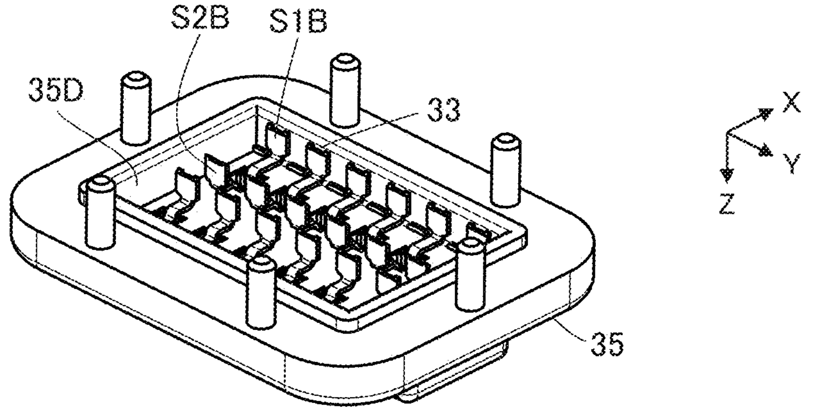
FIG. 45 is a perspective view of the first insulator of Embodiment 3 in which the contacts are temporarily retained, as viewed from an obliquely lower position.

In the process of attaching the connector 31 to the connection object F1, first, the respective contacts 33 are pushed into the first insulator 35 from the −Z direction toward the +Z direction, whereby the contacts 33 are temporarily retained in the first insulator 35 as shown in FIGS. 44 and 45. In this process, the U-shaped portion 33A of each contact 33 is passed through the corresponding through-hole 35E from the recess portion 35D on the −Z direction side of the first insulator 35 and inserted into the corresponding gap 35C formed between adjacent projection portions 35B, so that the first and second contact surfaces S1A and S2A are exposed on the +Z direction side of the first insulator 35.

Figure 46:
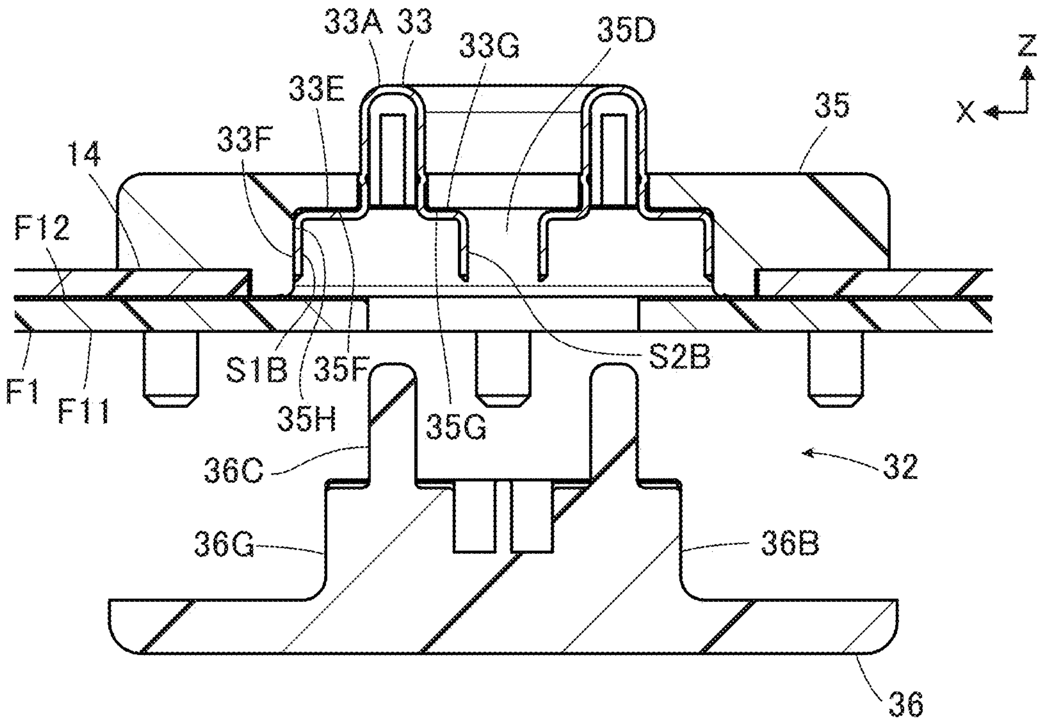
FIG. 46 is a cross-sectional view showing the connector according to Embodiment 3 in the process of attaching the connector to the connection object on the top surface of which the flexible conductors are exposed.

As shown in FIG. 46, of each contact 33, the first and second joint portions 33E and 33G, the first connection surface S1B connected to the first joint portion 33E, and the second connection surface S2B connected to the second joint portion 33G are situated within the recess portion 35D.

While the contacts 33 are aligned in two rows, i.e., the row on the +X direction side and the row on the −X direction side, the contacts 33 constituting the respective rows may be produced to be joined to one carrier (not shown) so that all of the contacts 33 can be moved and temporarily retained in the first insulator 35 at a time by use of the carrier. The carrier is cut and removed from the contacts 33 after all of the contacts 33 constituting the respective rows are moved and temporarily retained.

The first and second joint portions 33E and 33G of the contact 33 make contact with the retaining surfaces 35F and 35G in the recess portion 35D of the first insulator 35, respectively. The posture of the contact 33 thus retained in the housing 32 constituted of the first and second insulators 35 and 36 such that the first and second joint portions 33E and 33G make contact with the retaining surfaces 35F and 35G in the recess portion 35D of the first insulator 35, respectively, is called "first posture."

As described above, the X directional length L5 of the first joint portion 33E of the contact 33 is substantially the same as that of the retaining surface 35F of the first insulator 35. Accordingly, when the contact 33 is retained in the housing 32 in the first posture, the flat plate portion 33F connected to the first joint portion 33E of the contact 33 contacts or faces the inner wall surface 35H of the recess portion 35D of the first insulator 35, and the first connection surface S1B faces the opposite side from the inner wall surface 35H.

Now, after the reinforcing sheet 14 and the connection object F1 are placed on the −Z direction side of the first insulator 35 as shown in FIG. 46, the second insulator 36 is moved in the +Z direction to start the assembly thereof into the first insulator 35.

In this process, the columnar members 36C of the second insulator 36 are each inserted into the inside of the U-shaped portion 33A of the corresponding contact 33 from the −Z direction.

Further, the protrusion portion 36B of the second insulator 36 is inserted into the recess portion 35D of the first insulator 35 from the −Z direction. In this process, edges of the connection object F1 are pushed while being bent toward the +Z direction by the protrusion portion 36B of the second insulator 36 and thereby enter between the outer surface 36G of the protrusion portion 36B of the second insulator 36 and the inner wall surface 35H of the recess portion 35D of the first insulator 35.

Figure 47:
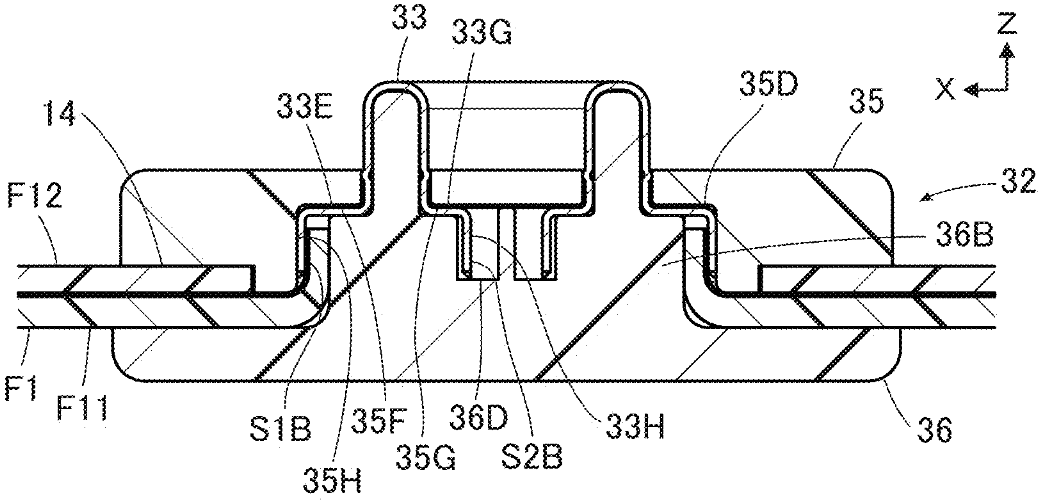
FIG. 47 is a cross-sectional view showing the connector according to Embodiment 3 attached to the connection object on the top surface of which the flexible conductors are exposed.

In this state, when the second insulator 36 is moved toward the first insulator 35 in the +Z direction, as shown in FIG. 47, the first and second joint portions 33E and 33G of each contact 33 are separately sandwiched between the +Z direction-side surface of the protrusion portion 36B of the second insulator 36 and the corresponding retaining surfaces 35F and 35G in the recess portion 35D of the first insulator 35. Thus, the contacts 33 are retained by the first insulator 35 and the second insulator 36.

Further, the flexible conductor F12 exposed on the top surface of the textile F11 of the connection object F1 is pushed and bent toward the +Z direction by the protrusion portion 36B of the second insulator 36, and in this state, the flexible conductor F12 is sandwiched between the inner wall surface 35H, which constitutes the first opposed surface, of the recess portion 35D of the first insulator 35 and the outer surface 36G, which constitutes the second opposed surface, of the protrusion portion 36B of the second insulator 36 and makes contact at a predetermined contact pressure with the first connection surface S1B of the contact 33 which faces the opposite side from the inner wall surface 35H of the recess portion 35D of the first insulator 35. Thus, the contacts 33 are electrically connected to the flexible conductors F12 of the connection object F1.

The flat plate portion 33H and the second connection surface S2B connected to the second joint portion 33G of each contact 33 are accommodated in the corresponding part-of-contact accommodating portion 36D of the second insulator 36.

The fixing posts 35J of the first insulator 35 are passed through the corresponding through-holes 36E of the second insulator 36 and project on the −Z direction side of the second insulator 36, and the −Z directional ends of those fixing posts 35J are heated and deformed whereby the second insulator 36 is fixed with respect to the first insulator 35.

Thus, attachment of the connector 31 to the connection object F1 is completed as shown in FIG. 35.

Figure 48:
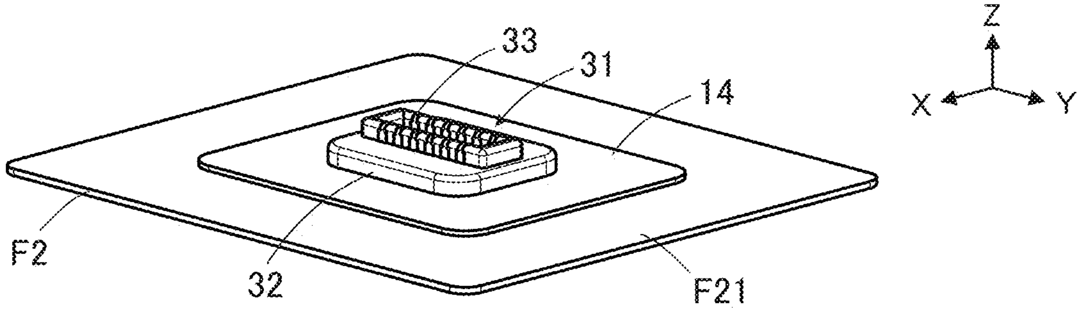
FIG. 48 is a perspective view of the connector according to Embodiment 3 attached to the connection object on the bottom surface of which the flexible conductors are exposed, as viewed from an obliquely upper position.
Figure 49:
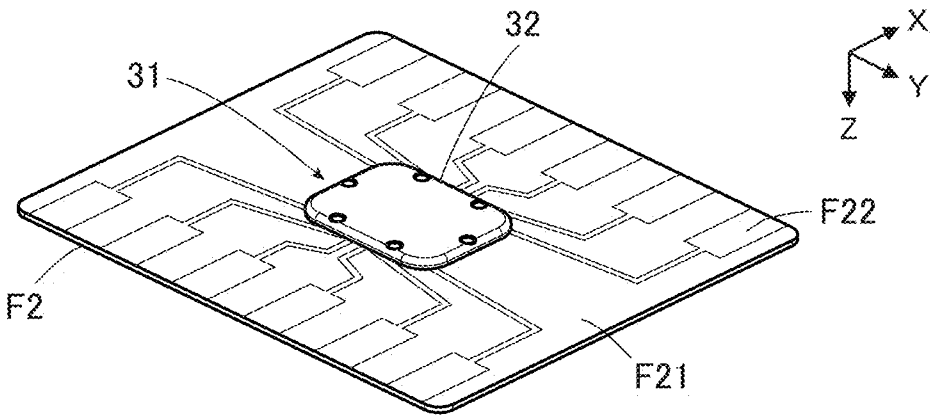
FIG. 49 is a perspective view of the connector according to Embodiment 3 attached to the connection object on the bottom surface of which the flexible conductors are exposed, as viewed from an obliquely lower position.

Also with the connector 31 according to Embodiment 3, the connector 31 can be attached to the connection object F2 having wiring constituted of the flexible conductors F22 being exposed on the bottom surface, which faces in the −Z direction, of the textile F21 as shown in FIGS. 48 and 49 only by changing the posture of the contacts 33 retained by the housing 32.

Figure 50:
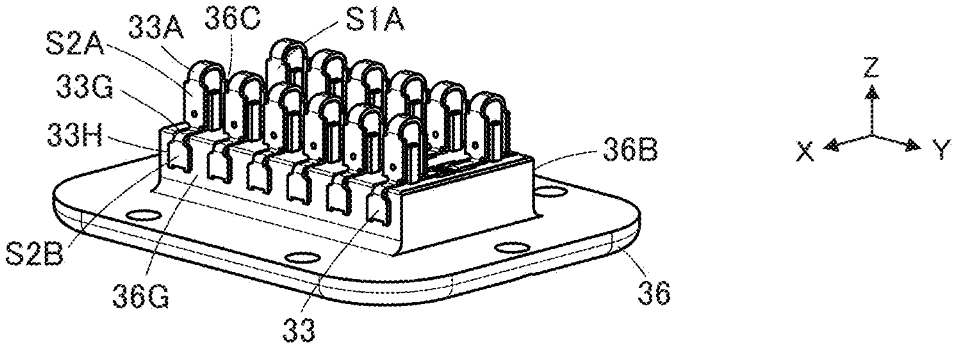
FIG. 50 is a perspective view of the second insulator of Embodiment 3 on which the contacts are temporarily retained, as viewed from an obliquely upper position.
Figure 51:
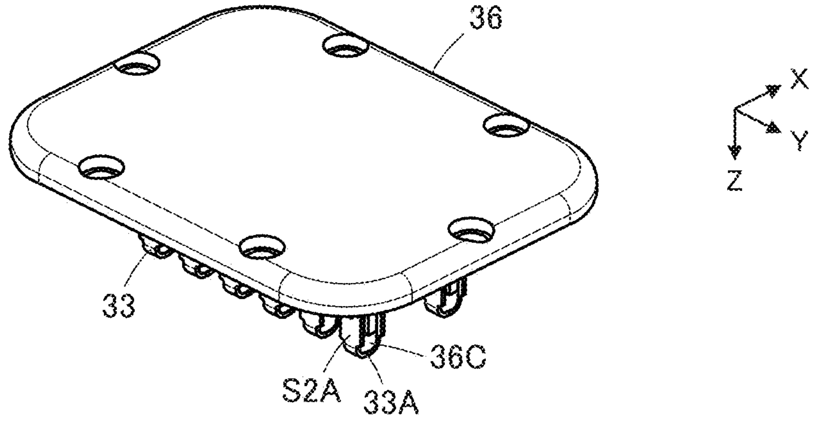
FIG. 51 is a perspective view of the second insulator of Embodiment 3 in which the contacts are temporarily retained, as viewed from an obliquely lower position.

In the process of attaching the connector 31 to the connection object F2, first, the respective contacts 33 are pushed into the second insulator 36 from the +Z direction toward the −Z direction, whereby the contacts 33 are temporarily retained in the second insulator 36 as shown in FIGS. 50 and 51. At this time, each contact 33 is temporarily retained in the second insulator 36 in "second posture" that is the posture inverted 180 degrees from the first posture shown in FIGS. 46 and 47 around the centerline C3 of the U-shaped portion 33A extending in the Z direction.

As described above, the second joint portion 33G of the contact 33 has an X directional length substantially the same as that of the shoulder portion 36H extending from the columnar members 36C up to the outer surface 36G of the protrusion portion 36B in the second insulator 36. Accordingly, the flat plate portion 33H connected to the second joint portion 33G of the contact 33 contacts or faces the outer surface 36G of the protrusion portion 36B of the second insulator 36, and the second connection surface S2B faces the opposite side from the protrusion portion 36B.

Figure 52:
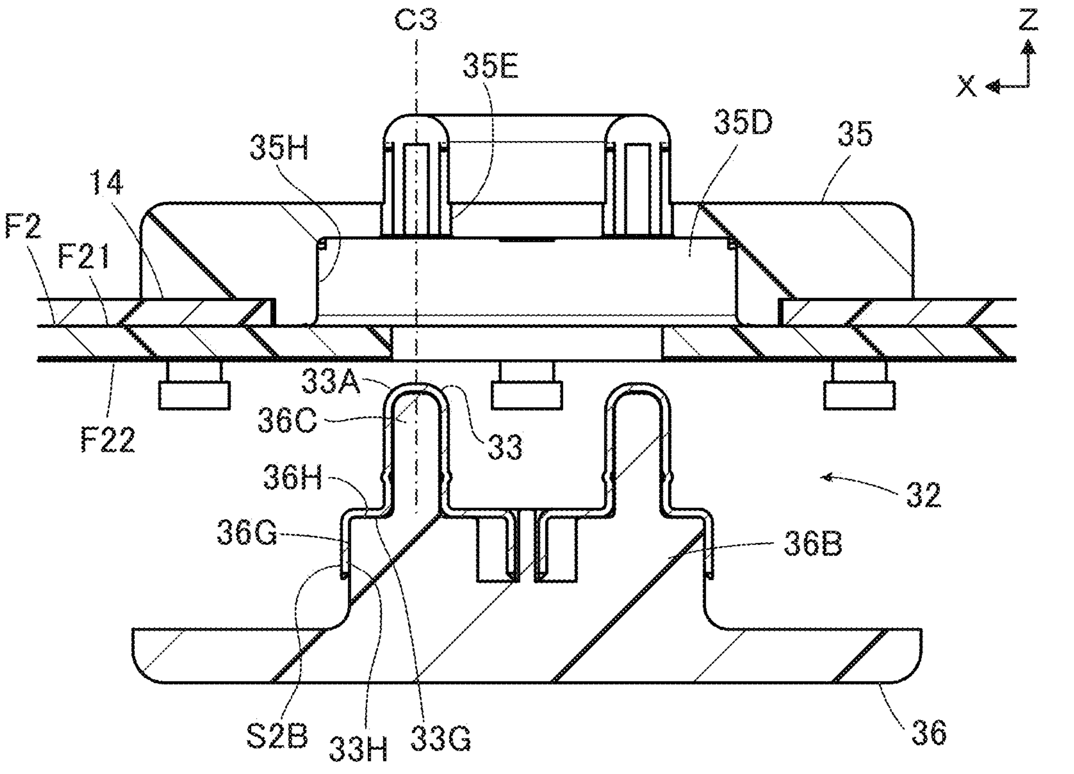
FIG. 52 is a cross-sectional view showing the connector according to Embodiment 3 in the process of attaching the connector to the connection object on the bottom surface of which the flexible conductors are exposed.

After the reinforcing sheet 14 and the connection object F2 are placed on the −Z direction side of the first insulator 35 as shown in FIG. 52, the second insulator 36 is moved in the +Z direction to start the assembly thereof into the first insulator 35.

At this time, the U-shaped portions 33A of the contacts 33 are, together with the columnar members 36C of the second insulator 36, inserted into the corresponding through-holes 35E from the recess portion 35D of the first insulator 35.

Further, the protrusion portion 36B of the second insulator 36 is inserted into the recess portion 35D of the first insulator 35 from the −Z direction. At this time, since the second joint portion 33G of the contact 33 has an X directional length smaller than that of the retaining surface 35F of the first insulator 35, a gap is formed between the flat plate portion 33H of the contact 33 and the inner wall surface 35H of the recess portion 35D of the first insulator 35, and the edge of the connection object F2 is pushed while being bent toward the +Z direction by the protrusion portion 36B of the second insulator 36 and thereby enters the gap.

Figure 53:
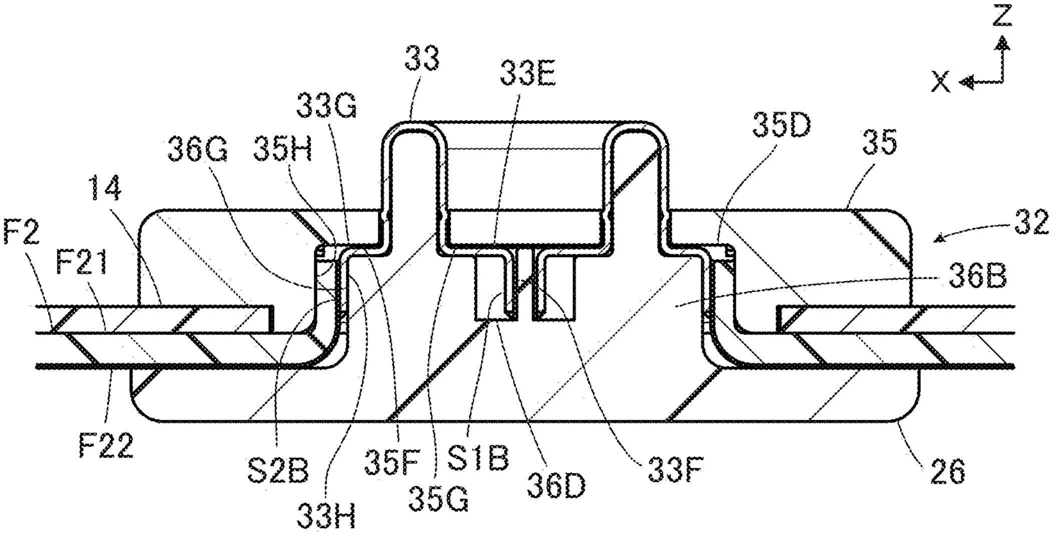
FIG. 53 is a cross-sectional view showing the connector according to Embodiment 3 attached to the connection object on the bottom surface of which the flexible conductors are exposed.
Figure 54:
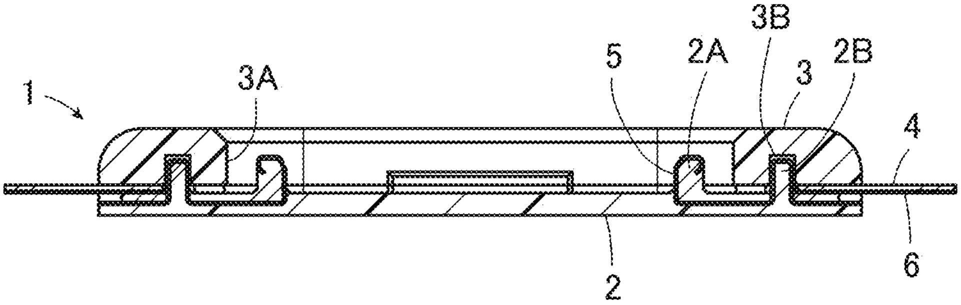
FIG. 54 PRIOR ART
FIG. 54 is a cross-sectional view showing a conventional connector.
Figure 55:
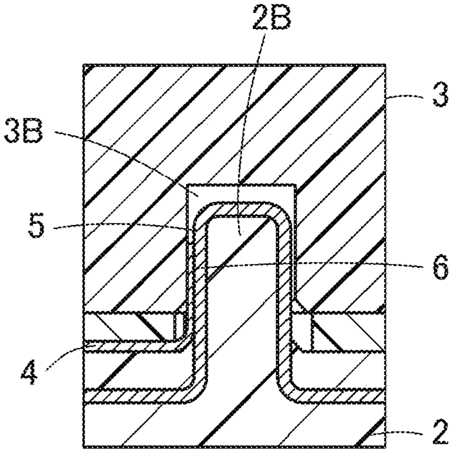
FIG. 55 PRIOR ART
FIG. 55 is an enlarged view of an important part of FIG. 54.

In this state, when the second insulator 36 is moved toward the first insulator 35 in the +Z direction, as shown in FIG. 53, the second and first joint portions 33G and 33E of each contact 33 are separately sandwiched between the +Z direction-side surface of the protrusion portion 36B of the second insulator 36 and the corresponding retaining surfaces 35F and 35G in the recess portion 35D of the first insulator 35. Thus, the contacts 33 are retained by the first insulator 35 and the second insulator 36.

Further, the edge of the connection object F2 and the flat plate portion 33H of the contact 33 are sandwiched between the inner wall surface 35H, which constitutes the first opposed surface, of the recess portion 35D of the first insulator 35 and the outer surface 36G, which constitutes the second opposed surface, of the protrusion portion 36B of the second insulator 36, and the flexible conductor F22 exposed on the bottom surface of the textile F21 of the connection object F2 makes contact with the second contact surface S2B of the contact 33 at a predetermined contact pressure. Thus, the contacts 33 are electrically connected to the flexible conductors F22 of the connection object F2.

The flat plate portion 33F and the first connection surface S1B connected to the first joint portion 33E of each contact 33 are accommodated in the corresponding part-of-contact accommodating portion 36D of the second insulator 36.

The fixing posts 35J of the first insulator 35 are passed through the corresponding through-holes 36E of the second insulator 36 and project on the −Z direction side of the second insulator 36, and the −Z directional ends of those fixing posts 35J are heated and deformed whereby the second insulator 36 is fixed with respect to the first insulator 35.

Thus, attachment of the connector 31 to the connection object F1 is completed as shown in FIG. 48.

In this way, with the connector 31 according to Embodiment 3, it is possible to attach the connector 31 to either of the connection objects F1 and F2 and electrically connect the contacts 33 to the flexible conductors F12 exposed on the top surface of the textile F11 of the connection object F1 or the flexible conductors F22 exposed on the bottom surface of the textile F21 of the connection object F2 by putting the contacts 33 such that the contacts 33 are temporarily retained in the first insulator 35 in the first posture or in the second insulator 36 in the second posture, with the fitting relationship between the connector 31 and a counter connector being maintained and without a change of any constituent component of the connector 31.

While, in Embodiments 1 to 3 described above, the contacts 13, 23, 33 are aligned in two rows parallel to each other, the invention is not limited thereto, and the contacts 13, 23, 33 may be aligned in one row. Further, this invention does not necessarily require the plurality of contacts 13, 23, 33, and it suffices if at least one contact 13, 23, 33 is provided.

In Embodiments 1 to 3, the first opposed surface (the inner wall surface 15H, 25H, 35H of the first insulator 15, 25, 35) and the second opposed surface (the outer surface 16G, 26G, 36G of the second insulator 16, 26, 36) extend in the Z direction that is the fitting direction; and the first connection surface S1B of the contact 13, 23, 33 and the flexible conductor F12 of the connection object F1, or the second connection surface S2B of the contact 13, 23, 33 and the flexible conductor F22 of the connection object F2 are sandwiched between the first and second opposed surfaces and make contact with each other in the X direction perpendicular to the fitting direction. However, the invention is not limited thereto. For instance, the first and second opposed surfaces may extend in the direction perpendicular to the fitting direction; and the first connection surface S1B of the contact 13, 23, 33 and the flexible conductor F12 of the connection object F1, or the second connection surface S2B of the contact 13, 23, 33 and the flexible conductor F22 of the connection object F2 may be sandwiched between the first and second opposed surfaces and make contact with each other in the fitting direction.

While a garment having a smart textile is taken as an example of the connection object F1, F2 to which the connector 11, 21, 31 is attached, in addition thereto, use may be made of a so-called flexible substrate in which a flexible conductor is disposed on a surface of an insulating substrate as the connection object F1, F2.

While, in Embodiments 1 to 3, the connector 11, 21, 31 is attached to the connection object F1, F2 along with the reinforcing sheet 14, the reinforcing sheet 14 may be omitted when it is not necessary to reinforce the connection object F1, F2.

What is claimed is:

1. A connecting method for connecting at least one contact of a connector to a flexible conductor exposed on one surface of a connection object, the connector being to be fitted with a counter connector in a fitting direction and comprising:

a housing attached to the connection object; and the at least one contact made of a conductive material and retained in the housing selectively in one of a first posture and a second posture that are postures inverted 180 degrees from each other around the fitting direction, wherein the housing includes a first insulator and a second insulator that are assembled to each other in a predetermined assembling direction while sandwiching the connection object therebetween, the at least one contact includes a contact portion to be contacted with a contact of the counter connector and a connection portion to be connected to the flexible conductor of the connection object, the contact portion projecting from the first insulator in the fitting direction, between a case where the at least one contact is retained in the housing in the first posture and a second case where the at least one contact is retained in the housing in the second posture, the contact portion is situated at a same position with respect to the housing and the connection portion is situated at a different position with respect to the housing, and the at least one contact is retained in the housing in, of the first posture and the second posture, a posture corresponding to an orientation of a surface of the connection object on which surface the flexible conductor is exposed, wherein the at least one contact includes a first contact surface and a second contact surface that are situated symmetrically with respect to a centerline along the fitting direction, a first connection surface connected to the first contact surface, and a second connection surface connected to the second contact surface, the first connection surface and the second connection surface are situated asymmetrically with respect to the centerline, at least one of the first contact surface and the second contact surface makes contact with the contact of the counter connector as the contact portion in both cases where the at least one contact is retained in the housing in the first posture and where the at least one contact is retained in the housing in the second posture, the first connection surface is connected to the flexible conductor of the connection object as the connection portion when the at least one contact is retained in the housing in the first posture, and the second connection surface is connected to the flexible conductor of the connection object as the connection portion when the at least one contact is retained in the housing in the second posture, the method comprising:

putting the at least one contact such that the at least one contact is temporarily retained in the first insulator or the second insulator of the housing in, of the first posture and the second posture, the posture corresponding to the orientation of the surface of the connection object on which surface the flexible conductor is exposed, disposing the connection object between the first insulator and the second insulator, and assembling the first insulator and the second insulator to each other in the predetermined assembling direction, whereby the connection portion of the at least one contact is connected to the flexible conductor of the connection object.

2. The connecting method according to claim 1, wherein the connection portion of the at least one contact temporarily retained is disposed to be displaceable and faces a first opposed surface of the first insulator or a second opposed surface of the second insulator with a distance larger than a thickness dimension of the flexible conductor, and by assembling the first insulator and the second insulator to each other with the flexible conductor being inserted between the connection portion and the first opposed surface or the second opposed surface, the connection portion is displaced between the first opposed surface and the second opposed surface and pressed against and connected to the flexible conductor.

* * * * *